United States Patent [19]
Leo

[11] Patent Number: 6,031,566
[45] Date of Patent: Feb. 29, 2000

[54] METHOD AND DEVICE FOR PROVIDING A MULTIPLE SOURCE DISPLAY AND A REMOTE VISUAL INSPECTION SYSTEM SPECIALLY ADAPTED FOR USE WITH THE DEVICE

[75] Inventor: Joseph K. Leo, Rego Park, N.Y.

[73] Assignee: Olympus America Inc.

[21] Appl. No.: 08/774,919

[22] Filed: Dec. 27, 1996

[51] Int. Cl.[7] .............................. H04N 7/18; G06K 9/00
[52] U.S. Cl. ............................ 348/82; 348/143; 382/103
[58] Field of Search .................................. 348/82, 65, 66, 348/67, 74, 72, 161, 162, 164, 61, 143, 165; 600/109, 110; 324/220, 222; 382/103, 128

[56] References Cited

U.S. PATENT DOCUMENTS

| | | |
|---|---|---|
| 4,221,053 | 9/1980 | Bobel, II et al. . |
| 4,403,251 | 9/1983 | Domarenok et al. . |
| 4,470,122 | 9/1984 | Sarr . |
| 4,642,687 | 2/1987 | Wedgwood et al. . |
| 4,855,820 | 8/1989 | Barbour . |
| 4,860,095 | 8/1989 | Kimura et al. ............................ 358/98 |
| 5,140,265 | 8/1992 | Sakiyama et al. ...................... 324/220 |
| 5,150,117 | 9/1992 | Hamilton et al. . |
| 5,251,127 | 10/1993 | Raab . |
| 5,257,100 | 10/1993 | Hattori et al. ............................ 358/98 |
| 5,305,098 | 4/1994 | Matsunaka et al. ...................... 348/65 |
| 5,347,987 | 9/1994 | Feldstein et al. ............................ 128/4 |
| 5,408,996 | 4/1995 | Salb . |
| 5,475,420 | 12/1995 | Buchin ...................................... 348/72 |
| 5,497,271 | 3/1996 | Mulvanny et al. . |
| 5,503,320 | 4/1996 | Webster et al. . |
| 5,506,912 | 4/1996 | Nagasaki et al. ........................ 382/103 |
| 5,512,940 | 4/1996 | Takasugi .................................... 348/45 |
| 5,519,410 | 5/1996 | Smalanskas et al. . |
| 5,589,874 | 12/1996 | Buchin ...................................... 348/72 |
| 5,592,216 | 1/1997 | Uehara et al. ............................. 348/74 |
| 5,649,021 | 7/1997 | Matey et al. ............................ 382/128 |
| 5,697,885 | 12/1997 | Konomura et al. ...................... 600/109 |

OTHER PUBLICATIONS

"Video–Imagescope and Fiberscope Eddy Current Probe" *Hocking Application Bulletin H–201*, Mar. 1996.

"Phasec 1.1 Portable Phase Plane Eddy Current Instrument" brochure published by Krautkramer Branson–Hocking. No date.

"Electronic Turning Tool™" brochure published by Olympus Industrial. No date.

"Eddy Current Probes: Aerospace & General Purpose Range" product brochure, Edition 4, published by Hocking. No date.

*Primary Examiner*—Bryan Tung
*Assistant Examiner*—Tung Vo
*Attorney, Agent, or Firm*—Straub & Pokotylo; John C. Pokotylo

[57] ABSTRACT

A method and device for displaying information from multiple sources, in a way that permits rapid assimilation and interpretation of the information. The information may originate from the inspection, e.g., via a remote visual inspection system, of a work piece. The method and device processes (i) frames of video data, each frame including data corresponding to an array of pixels, including video of a sensor, and (ii) data output by the sensor by (a) locating the sensor in one of the frames of video data to define an anchor location, (b) accepting the data output by the sensor, (c) converting the data output by the sensor to either a numeric value or a graphical representation, and (d) in the one of the frames, modifying pixels data in a vicinity of the anchor location based on the numeric value or graphical representation to form a modified frame.

38 Claims, 19 Drawing Sheets

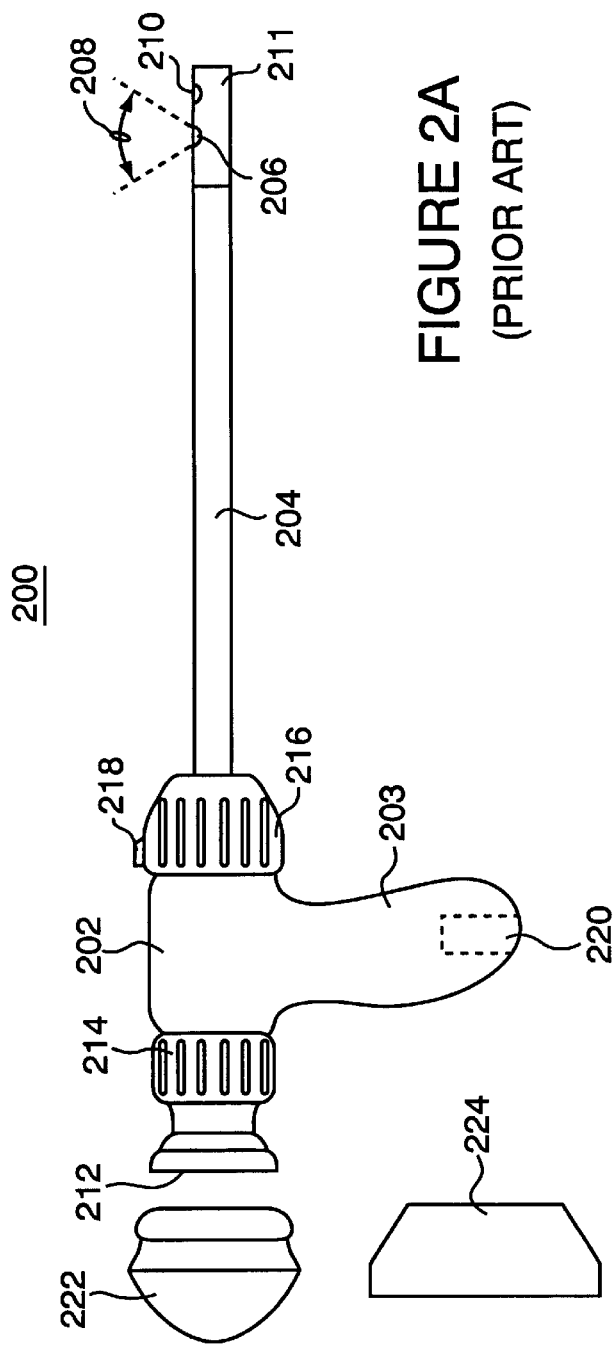
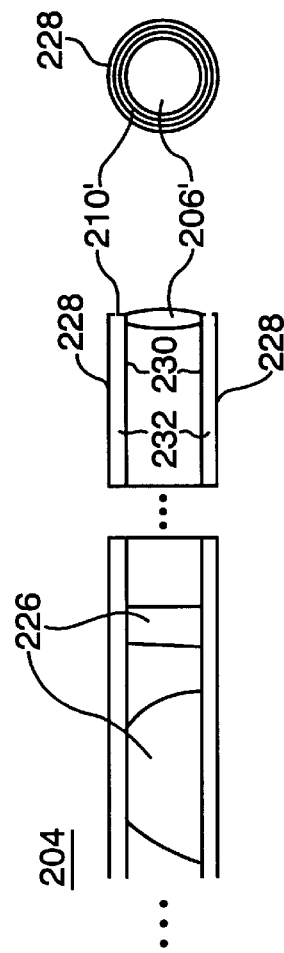
FIGURE 2A (PRIOR ART)
FIGURE 2B (PRIOR ART)
FIGURE 2C (PRIOR ART)

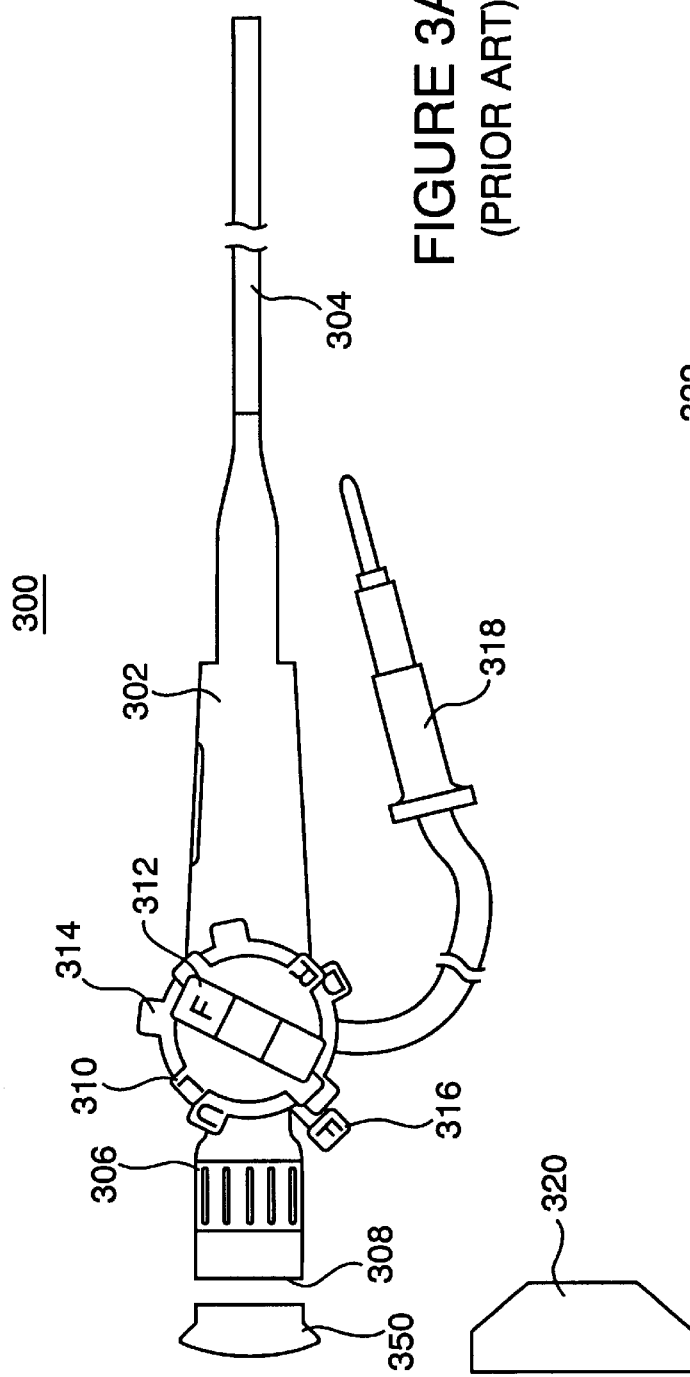
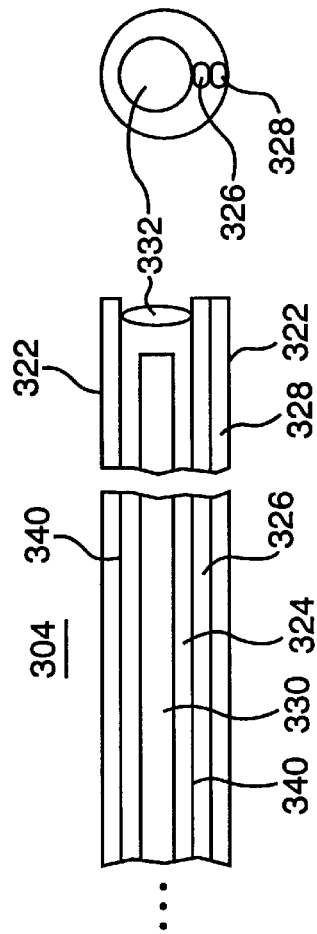
FIGURE 3A (PRIOR ART)
FIGURE 3B (PRIOR ART)
FIGURE 3C (PRIOR ART)

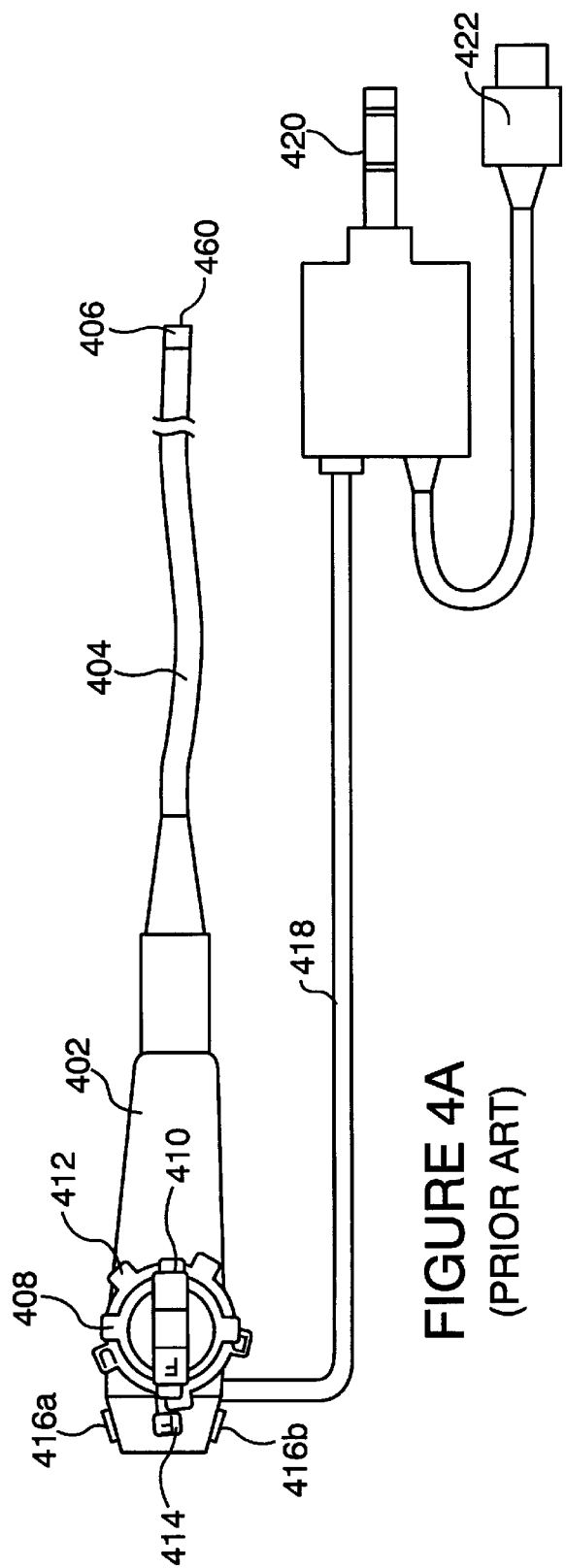
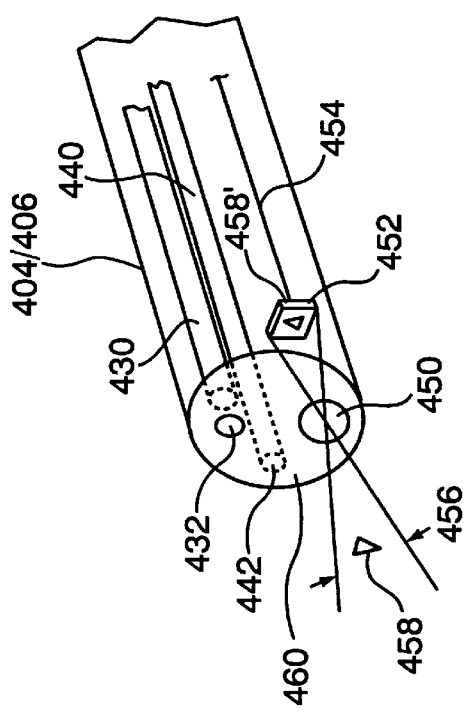
FIGURE 4A (PRIOR ART)
FIGURE 4B (PRIOR ART)

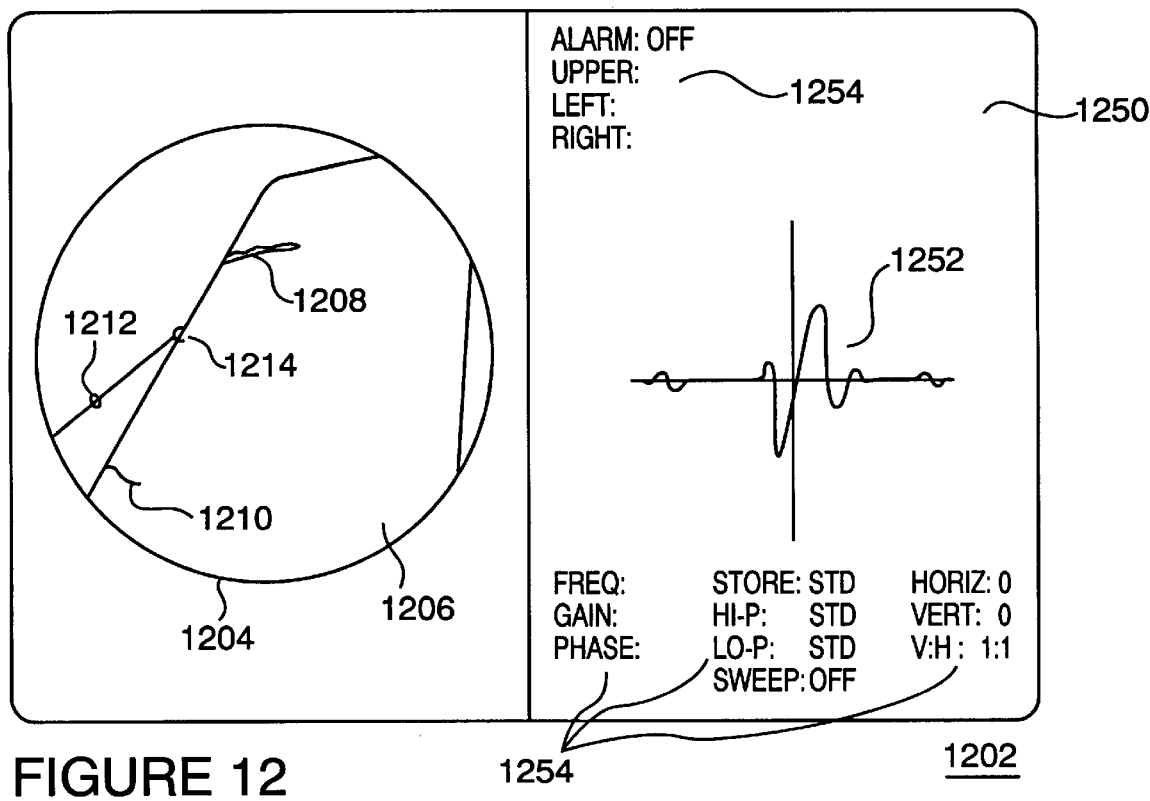
FIGURE 12
FIGURE 13
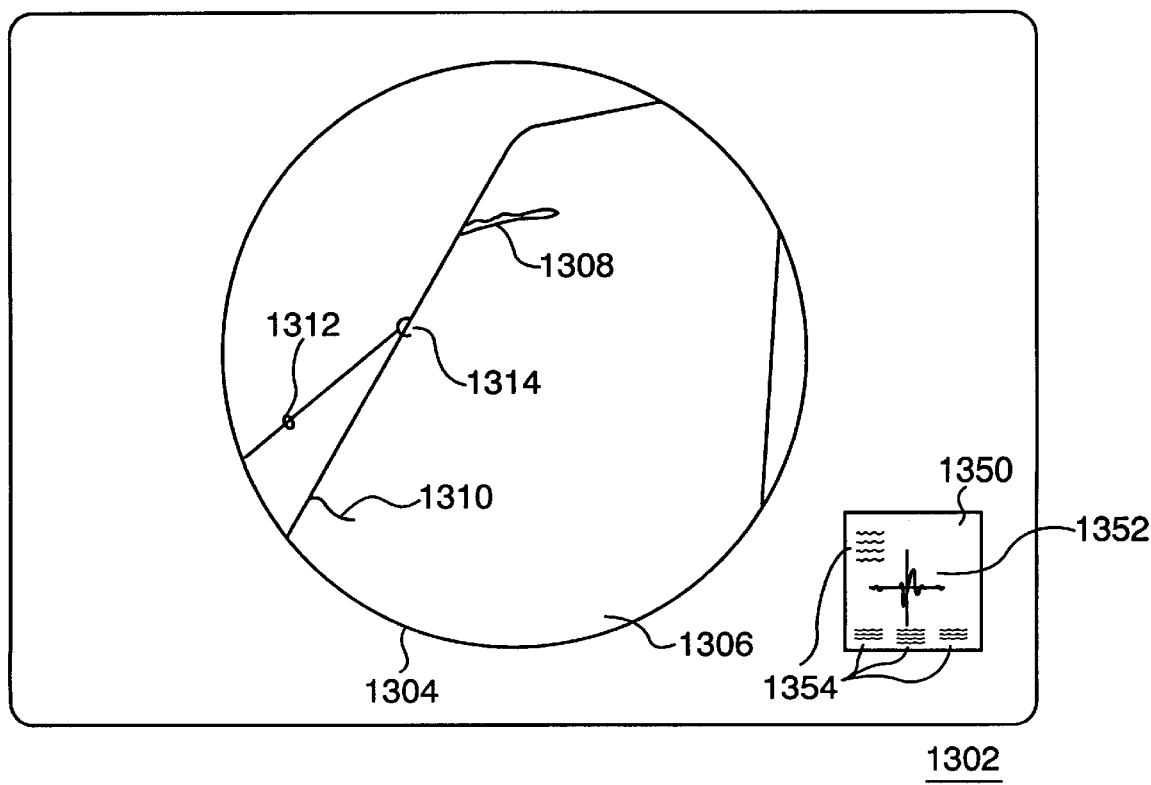

1702

1802

METHOD AND DEVICE FOR PROVIDING A MULTIPLE SOURCE DISPLAY AND A REMOTE VISUAL INSPECTION SYSTEM SPECIALLY ADAPTED FOR USE WITH THE DEVICE

BACKGROUND OF THE INVENTION a. Field of the Invention

My invention concerns the display of information from multiple sources, in a way that permits rapid assimilation and interpretation of the information. In particular, my invention concerns the display of information from the inspection of a work piece and more specifically, the display of information from the remote inspection of the work piece.

b. Related Art

Various systems or parts must be inspected periodically or when a problem is suspected. For example, aircraft engines have a series of turbines, each having a number of turbine blades, which must be inspected from time to time. As shown in FIG. 1b, if, for example, an aircraft engine ingests a bird, a crack 110 in a turbine blade 106 may develop. The crack 110 may be either (a) insignificant such that no maintenance is needed, (b) relatively small such that the crack may be ground out to form a "blend" (i.e., an aerodynamically acceptable shaping), or (c) relatively large such that the blade 106 must be replaced.

As shown in the simplified schematic of FIG. 1a, turbine blades 106, which extend radially from an axis 104, are confined within a housing 102. To facilitate inspection of the turbine blades 106 without opening the housing 102, one or more inspection ports 108 are provided. Remote visual inspection systems, including optical instruments such as borescopes, flexible fiberscopes, and flexible videoimagescopes for example, are often used to remotely inspect the turbine blades 106. More specifically, each of the aforementioned optical instruments includes an insertion tube that may be inserted through the inspection port 108. In each case, the insertion tube relays an image, received at its distal end, which is within the housing 102, to its proximal end, which is outside of the housing 102. An electronic turning tool (such as model OTT, sold by Olympus America Inc.) may be used to automatically and precisely rotate the turbine such that each blade 106 may be viewed and such that blades 106 of interest may be "tagged" for later, more thorough, inspection. Although borescopes, flexible fiberscopes, and flexible videoimagescopes are known to those skilled in the art, a brief overview of these optical instruments is provided below for the reader's convenience.

FIG. 2a illustrates a side view of a rigid borescope 200 which may be used, in conjunction with an attached video camera (not shown), as a video source for the display system of my invention. As shown in FIG. 2a, the borescope includes a body 202, which may include a handle 203 for example, and an insertion tube 204. The body 202 is connected to the proximal end of the insertion tube 204. At the distal end of the insertion tube, a tip adapter 211 includes a lens system 206 having a field-of-view 208, and a light emitting means 210. Although the tip adapter 211 shown provides 90 degree (or right angle) viewing, other tip adapters (e.g., direct view, fore oblique 45 degree, and retro 110 degree) are available, as is known to those skilled in the art.

The body 202 of the borescope includes a focus control ring 214 and an eyepiece 212. The borescope may also include a orbital scan dial 216 which permits a user to rotate (e.g., through 370 degrees) the insertion tube 204 with respect to the body 202. The orbital scan dial 216 preferably includes a orbital scan direction indicator 218 such that a user can determine the orientation of the tip adapter 211 when it is shielded from the view of the user, for example, by the housing 102. The body 202 also preferably includes a light guide connector 220 for accepting illumination light from an external light source.

An eyecup 222 is provided to protect the eyepiece 212 optics when the borescope 200 is not in use. A video adapter 224 may be used to connect a video camera (not shown) to the eyepiece 212 such that inspection via a video monitor is possible. The video camera outputs video frames which comply with the National Television Standards Committee (or "NTSC"), the Phase Alternating Line system (or "PAL"), or the S video (or Y-C) standard, for example.

FIG. 2b is a cross-sectional side view of a portion of the insertion tube 204 of the rigid borescope 200 of FIG. 2a. As shown, wall 228 forms an outer cylinder which surrounds wall 230 forming an inner cylinder. The space defined within the inner cylinder houses an objective lens 206' and an optical system 226 which relays the image from the objective lens 206' to the eyepiece 212. A cavity 232 formed between the inner and outer cylinders may be used to accommodate light guides, such as fiber optic strands for example. A working channel (not shown) may also be provided, through which sensors and/or tools may be provided.

FIG. 2c is an end view of the distal end of a direct view optical tip adapter 211'. As shown in FIG. 2c, a window 210', for passing light from the light guides to illuminate the work piece being inspected, may be provided around the objective lens 206'.

FIG. 3a is a side view of a flexible fiberscope 300 which may be used, in conjunction with an attached video camera (not shown), as a video source for the display system of my invention. As with the rigid borescope 200 discussed above, the flexible fiberscope 300 also includes a body 302 and an insertion tube 304. However, in this instance, the insertion tube 304 is flexible such that its distal end may be articulated left and right, by means of left-right articulation control 310, and up and down, by means of up-down articulation control 314. The left-right articulation control 310 may be locked by brake 312, while the up-down articulation control 314 may be locked by brake 316. The body 302 also includes a diopter adjusting ring 306 and an eyepiece 308. As was the case with the rigid borescope 200 discussed above, the eyepiece may by covered with an eye cup 350 when not in use. Further, an adapter 320 may be used to connect a video camera (not shown) to the eyepiece 308. Finally, a light guide connector 318 permits connection to an external light source.

FIG. 3b is a cross-sectional side view, and FIG. 3c is an end view of the distal end, of the insertion tube 304 of the flexible fiberscope 300 of FIG. 3a. Wall 322 defines an outer cylinder and wall 340 defines an inner cylinder. Within the space 324 defined by the inner cylinder, a bundle of optical fibers 330 carries an image focused at its distal end by objective lens 332. Light guide and working channels 326 and 328, located between the inner and outer cylinders, may for example house an illumination means and may accommodate sensors and/or tools.

FIG. 4a is a side view of a flexible videoimagescope 400 which may be used as a video source for the display system of my invention. As with the flexible fiberscope 300 discussed above, the flexible videoimagescope 400 also includes a body 402 and a flexible insertion tube 404. The distal end of the flexible insertion tube 404 may be articulated left and right, by means of left-right articulation control 408, and up and down, by means of up-down articulation control 412. The left-right articulation control 408 may be locked by brake 410, while the up-down articulation control 412 may be locked by brake 414. Finally, a light guide and video cable 418 permits connection to an external light source, via connector 420, and to a camera control unit, via connector 422.

Unlike the rigid borescope 200 and the flexible fiberscope 300 discussed above, the videoimagescope 400 does not have focus or diopter adjustment rings, nor does it have an eyepiece. This is because, as alluded to above, the videoimagescope provides a video output to an external camera control unit. More specifically, as shown in FIG. 4b, which is a partial cut-away, perspective view of the distal end of the videoimagescope of FIG. 4a, an objective lens 450 focuses an image 458' of an object 458 in its field of view 456, onto an imaging device, such as a charge coupled device (or "CCD") 452 for example. The CCD 452 (and associated circuitry) provides a sequence of analog waveforms based on the charge accumulated in each element of the CCD array. The camera control unit, mentioned above, converts the sequence of analog waveforms to frames of video, which comply with the NTSC, PAL or S video standard for example.

As is further shown in the perspective view of FIG. 4b, the distal end of the insertion tube of the videoimagescope 400 includes an illumination window 432 passing light from a light guide 430, as well as a working channel 440 terminating at port 442.

To reiterate, each of the above mentioned optical instruments may include a working channel through which a grinding tool, or retrieval tool (e.g., a magnet, a snare loop, a four-wire basket, or forceps) may pass. Moreover, a sensor, such as an eddy probe or ultrasound sensor (See e.g., ultrasound sensor 600 of FIG. 6) for example, may pass through the working channel. Such probes or sensors are useful for confirming an interpretation of video data. For example, an inspector inspecting a turbine blade may observe a dark section which may be a crack, or merely a shadow. Eddy current or ultrasound sensor output may be used to determine whether the dark section is in fact a crack, or merely a shadow.

Combining video data with sensor data is known. For example, in the medical field, the use of an endoscopic ultrasound center (e.g. model EU-M30 manufactured by Olympus Optical Co., Ltd.) with a videoscope (e.g., an EVIS Series videoscope manufactured by Olympus Optical Co., Ltd) and a video processing center (e.g., an EVIS Video System Center manufactured by Olympus Optical Co., Ltd.) to provide a picture-in-picture display of the videoscope image within the ultrasound image is known. Also, U.S. Pat. No. 4,855,820 (hereinafter referred to as "the Barbour patent") discusses a video display system in which the readout of a temperature sensor is displayed over the video output of a video camera. Unfortunately, in each of these known systems, the data from the sensor is displayed at an arbitrary location, without regard to the location of the sensor. Consequently, the operator must switch his or her attention between the video displaying the actual sensor (e.g., to move the sensor with respect to the observed object) and viewing the output data of the sensor. Moreover, in the Barbour patent, the sensor output is a digital readout, i.e., a number. For rapidly changing data, such a readout is not practical because it is difficult to quickly assimilate and interpret.

U.S. Pat. No. 4,642,687 (hereinafter referred to as "the Wedgwood et al patent") discusses a system for detecting non-visual signals, such as those based on ultrasound or radiation for example. The system discussed in the Wedgwood et al patent includes (i) a movable probe which indicates the location of a detection system and includes a light source which is "on" when detection is positive, (ii) a video camera which responds to the light source, (iii) a memory system which stores image locations at which the light source was "on", and (iv) a mixer for creating a superimposed image based on the output of the memory system and the output of the video camera. Unfortunately, whether or not the camera recognizes the probe depends on the on/off state of the detector. Moreover, storage and readout of the image locations from memory would apparently have to be synchronized with the video output of the video camera—indeed, not a trivial task!

Thus, a display system in which sensor data can be easily and rapidly viewed, assimilated, and interpreted, in conjunction with associated video, is needed. Such a display system should be operable with remote visual inspection systems including optical instruments such as borescopes, fiberscopes, and videoimagescopes for example. Finally, the system should permit generation of a graphical profile of the work piece being inspected.

SUMMARY OF THE INVENTION

My invention meets the aforementioned needs by providing a method for processing (i) video data (e.g., of a work piece being inspected) which includes video of a sensor, and (ii) data output by the sensor, including steps of: (a) accepting analog video data; (b) converting the analog video data to frames, each frame including data corresponding to an array of pixels; (c) locating the video of the sensor in one of the frames to define an anchor location; (d) accepting the data output by the sensor; (e) digitizing the data output by the sensor to form digitized sensor data; (f) converting the digitized sensor data to either a numeric value or a graphical representation; and (g) in the one of the frames, modifying pixels in a vicinity of the anchor location based on the numeric value or graphical representation to form a modified frame. The modified frame may be displayed, recorded, and/or stored to a file.

The step of locating the video of the sensor in the frame to define an anchor location includes sub-steps of: (i) checking the data corresponding to the array of pixels to determine whether a pixel within the array has data corresponding to an attribute (e.g., color) of the sensor; and (ii) determining the anchor location at a location of a pixel which has data corresponding to the attribute (e.g., color) of the sensor. In a refined embodiment, the step of locating the video of the sensor to define an anchor location includes sub-steps of: (i) segmenting the frame into sub-images; (ii) within one of the sub-images, checking data corresponding to each pixel to determine whether a pixel has data corresponding to an attribute (e.g., color) of the sensor; (iii) if the sub-image has a pixel having data corresponding to the attribute (e.g., color) of the sensor, determining the anchor location to be the location of the pixel; and (iv) if the sub-image does not have a pixel having data corresponding to the attribute (e.g., color) of the sensor, continuing processing with a next sub-image. If it is known that the video of the sensor is more likely located within a particular sub-image than other sub-images, that particular sub-image is searched first.

One version of the method further includes steps of: (i) selecting the graphical representation from a group of candidate graphical representations; and (ii) selecting parameters for the selected graphical representation. In this version, the step of converting the digitized sensor data to the graphical representation uses the selected graphical representation and the parameters. The graphical representation may be a cloud, a halo, a bar graph meter, or a scaled vector.

The sensor data may include data of a first type and data of a second type. In this case, the step of converting the digitized sensor data to a graphical representation includes sub-steps of: (i) varying a first attribute of the graphical representation based on the data of the first type; and (ii) varying a second attribute of the graphical representation based on the data of the second type. Each of the first and second attributes of the graphical representation may be size, length, diameter, inner diameter, outer diameter, color, brightness, sharpness or orientation.

The method of my invention may also be used for processing (i) frames of video data (e.g., of a work piece being inspected), each frame including data corresponding to an array of pixels, including video of a sensor, and (ii) data output by the sensor, by (a) locating the sensor in one of the frames of video data to define an anchor location, (b) accepting the data output by the sensor, (c) converting the data output by the sensor to a numeric value or a graphical representation, and (d) in the one frame, modifying pixel data in a vicinity of the anchor location based on the numeric value or graphical representation to form a modified frame.

The frames of video data may include the field of view of an image capturing device. In such instances, the method of my invention can generate profiles of an object being viewed by (a) fixing the field of view of the image capturing device, (b) moving the sensor with respect to the image capturing device, (c) converting the data output by the sensor to a numeric value or a graphical representation, (d) in at least one of the frames, modifying pixels in a vicinity of the anchor location based on the numeric value or graphical representation to form at least one modified frame, (e) sampling, in response to a user selection or a clock, the numeric value or graphical representation replacing the pixels in the vicinity of the anchor location such that subsequent frames also include the numeric value or graphical representation in the vicinity of the anchor location, and (f) generating an inspection profile by repeating the above steps.

My invention also provides a device for inspecting an object, the device including: (a) a video generation device, having a field of view, for generating analog video of the object; (b) a sensor, located within the field of view of the video generation device, for detecting a physical phenomenon related to an attribute of the object; (c) a video frame generation device, receiving the analog video of the object from the video generation device, for generating frames, each frame including data corresponding to an array of pixels, based on the analog video of the object; (d) a signal generation device, for generating a signal based on the physical phenomenon detected by the sensor; (e) a converter, receiving the signal from the signal generation device, for converting the signal to a numeric value or graphical representation; (f) an anchor generation device, receiving frames from the video frame generation device, for determining the location of an image of the sensor within a frame and generating an anchor at the location; and (g) a video processing device, receiving the anchor from the anchor generation device, the frames from the video frame generation device, and the numeric representation or graphical representation from the converter, for modifying pixels in a vicinity of the anchor in a frame, based on the numeric value or graphical representation. The video generation device may be a remote visual inspection device such as a borescope coupled with a video camera, a fiberscope coupled with a video camera, or a videoimagescope provided with a camera control unit. The sensor may be provided through a working channel in the video generation device and may exit and re-enter the working channel. The remote visual inspection device includes an insertion tube having a proximal end and a distal end, and including a working channel extending from the proximal end to the distal end of the insertion tube. In a preferred embodiment of my invention, the device further includes a biasing system for biasing the sensor away from the distal end of the insertion tube. The sensor may be an eddy current probe or an ultrasound probe for example.

BRIEF DESCRIPTION OF THE DRAWINGS

FIG. 2a is a side view of a rigid borescope which may be used, in conjunction with an attached video camera, as a video source for the display system of my invention.

FIG. 2b is a cross-sectional side view of the insertion tube of the rigid borescope of FIG. 2a.

FIG. 2c is an end view of the distal end of the insertion tube of the rigid borescope of FIG. 2a.

FIG. 3a is a side view of a flexible fiberscope which may be used, in conjunction with an attached video camera, as a video source for the display system of my invention.

FIG. 3b is a cross-sectional side view of the insertion tube of the flexible fiberscope of FIG. 3a.

FIG. 3c is an end view of the distal end of the insertion tube of the flexible fiberscope of FIG. 3a.

FIG. 4a is a side view of a flexible videoimagescope which may be used as a video source for the display system of my invention.

FIG. 4b is a partial cut-away, perspective view of the distal end of insertion tube of the videoimagescope of FIG. 4a.

FIG. 12 illustrates a display produced by a first embodiment of the system of my invention.

FIG. 13 illustrates a display produced by a second embodiment of the system of my invention.

DETAILED DESCRIPTION

In the detailed description which follows, my invention will be described in terms of the functions it performs, an architecture which may be used to implement it, and examples of its operation. Finally, special features, providing advantages when my invention is used with optical inspection instruments and eddy current probes, are discussed.

Figure 7:
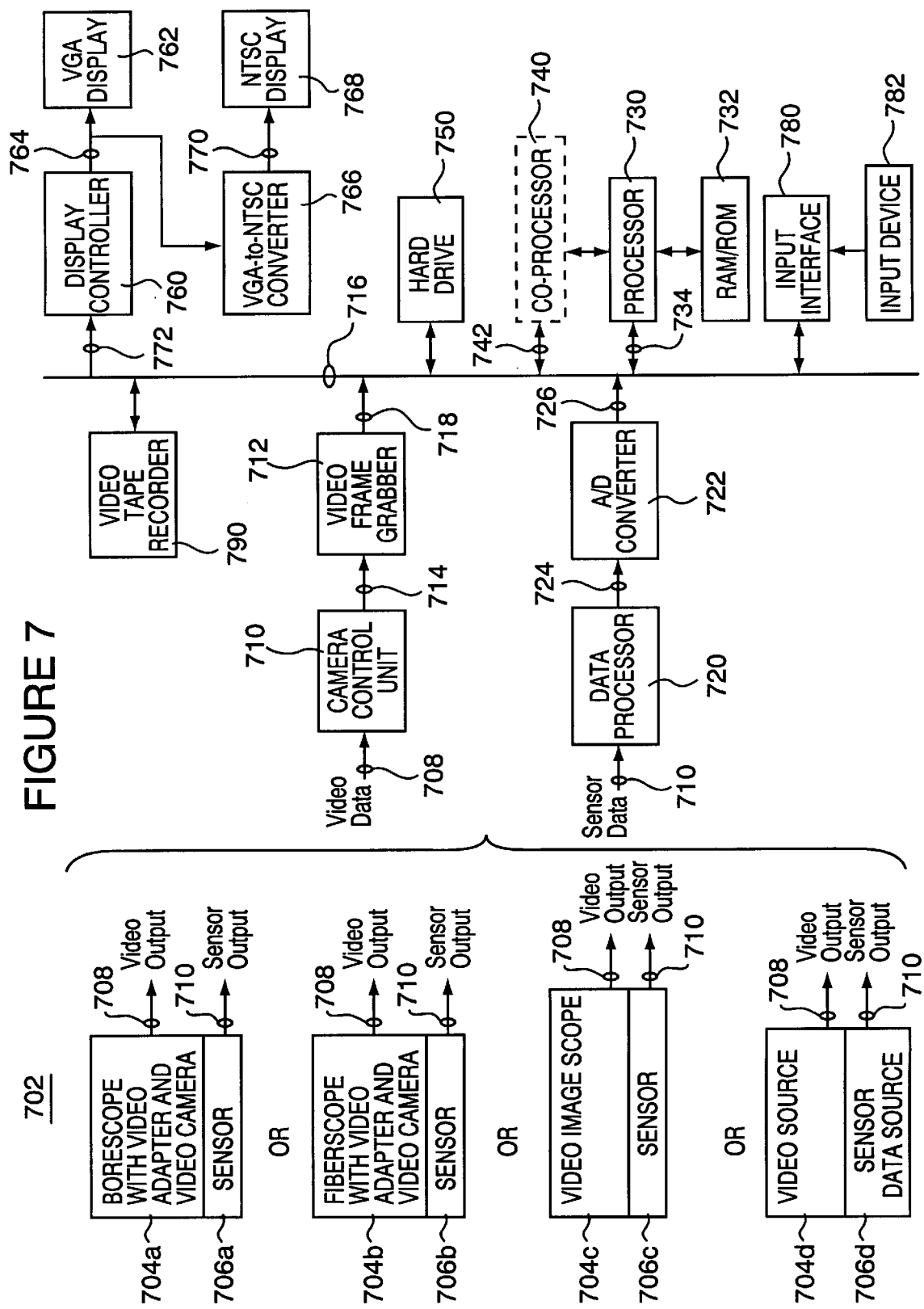
FIG. 7 illustrates a preferred embodiment of the display system of my invention.

Basically, my invention functions to (i) accept video image data, (ii) determine the location of a sensor probe in the video image data, (iii) accept sensor data, (iv) preferably convert the sensor data to a non-obtrusive graphical representation, and (v) provide a display of the video image data with the sensor data (or graphical representation thereof) anchored to the determined location of the sensor probe. FIG. 7 is a block diagram which illustrates a preferred embodiment of the display system of my invention and which, when properly configured (e.g., provided with appropriate instructions), supports each of the aforementioned functions and permits real time execution of such functions.

The system of FIG. 7 accepts video and sensor data which, for example, is provided by the video output 708 of a video source 704d and the sensor output 710 of a sensor data source 706d. The video source may be, for example, (a) a borescope 200 with a video adapter 224 and video camera (collectively 704a) and a sensor 706a provided in a working channel of the borescope 200, (b) a fiberscope 300 with a video adapter 320 and video camera (collectively 704b) and a sensor 706b provided in a working channel 326/328 of the fiberscope 300, or (c) videoimagescope 400 (704c) and a sensor 706c provided in a working channel 440 of the videoimagescope 400.

If the video data 708 is from the CCD 452 (and associated circuitry) of a videoimagescope 400, it will typically be in the form of a serial sequence of analog waveforms. Such data is provided to an input of a camera control unit 710 which converts the sequence of analog waveforms to a known video standard, such as NTSC, PAL or S for example. On the other hand, if the video data is provided from a video camera connected to the eyepiece of a borescope 200 or fiberscope 300, it should bypass the camera control unit 710. This is because the video camera will provide video in accordance with a known video standard such as NTSC, PAL, or S for example.

Figure 22:
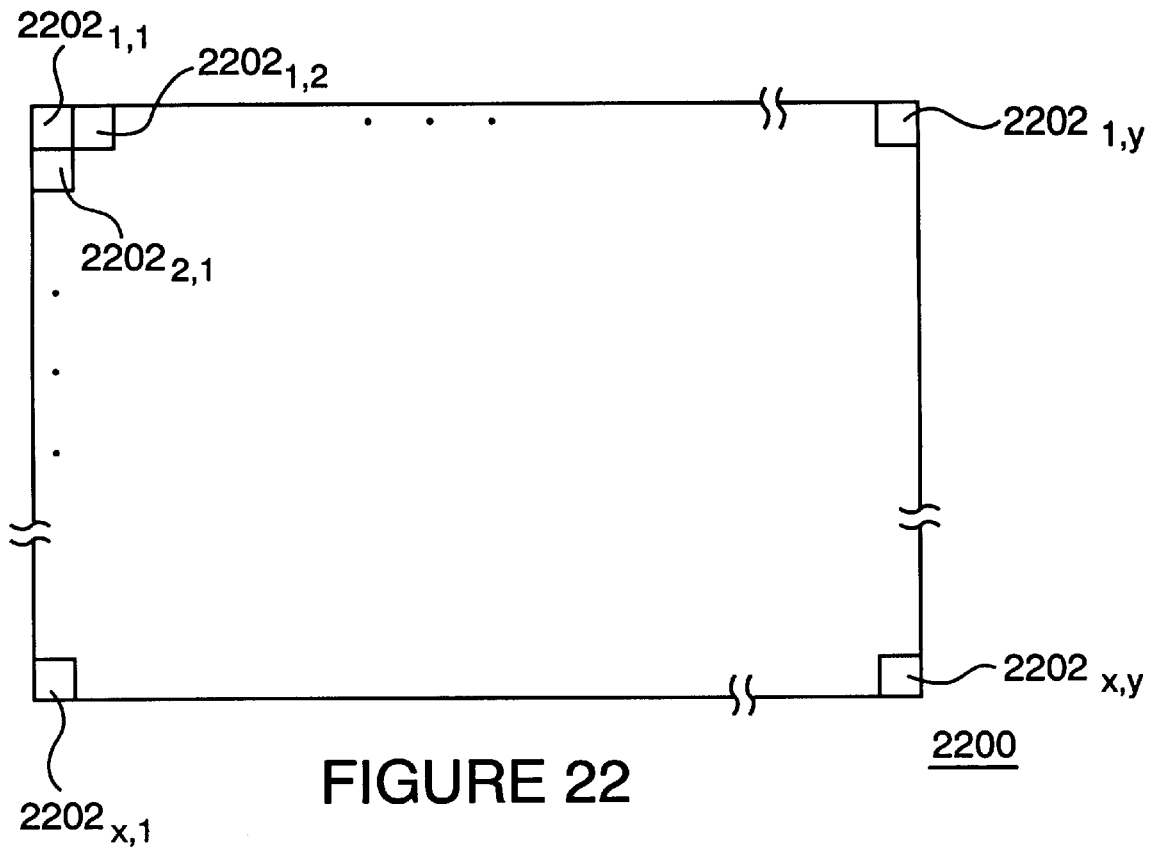
FIG. 22 illustrates a video frame which includes x rows and y columns of pixels.
Figure 23:
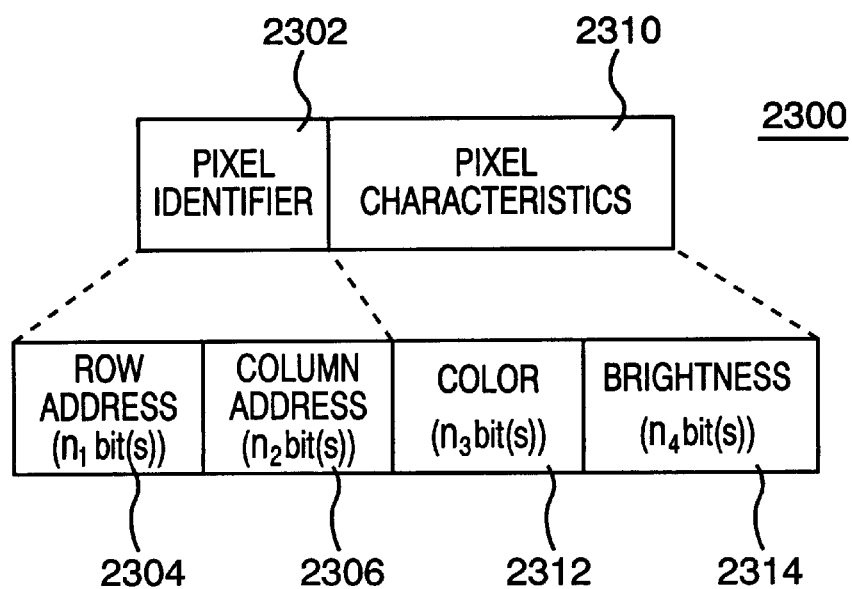
FIG. 23 illustrates an exemplary pixel data structure.

In either case, the formatted, analog, video signal 714 is provided to a video frame grabber 712 which converts the analog video signal to video frames. Each of the video frames has a matrix of pixels, each pixel having an address based on its location (e.g., row, column) within the matrix, one or more bits representing brightness information, and one or more bits representing color information. More specifically, as shown in FIG. 22, a video frame 2200 includes x rows and y columns of pixels 2202. Thus, each frame includes x * y pixels. FIG. 23 illustrates an exemplary pixel data structure 2300. As shown, the pixel data structure 2300 may include a pixel identifier field 2302 and a pixel characteristic field 2310. The pixel identifier field 2302 may include an $n_1$ bit (e.g., 10-bit) row address field 2304 and an $n_2$ bit (e.g., 10-bit) column address field 2306. The pixel characteristics field 2310 may include an $n_3$ bit (e.g., 8-bit) color field 2312 and an $n_4$ bit (e.g., 8-bit) brightness field 2314. Video frames 718 may be retrieved by the processor 730 (or co-processor 740) via internal bus system 716.

At the same time, measurements of physical phenomena (e.g., electrical charge, current, voltage, magnetic field, pressure, temperature, radiation field, sound, etc.) from the sensor 710 is provided to a data processor 720 (e.g., a circuit) which outputs one or more analog signals (e.g., analog electrical signals) 724. These analog signals 724 are then converted, by analog-to-digital converter(s) 722, to provide digital signal(s) 726 based on the sensor data 710. These digital signals(s) 726 are made available to the processor 730 (or a co-processor 740), via the internal bus system 716.

A user may input selection and parameter data (described in more detail below), in response to queries generated by the processor 730, operating under the control of stored instructions, via input device 782. Such user inputs are made available to the processor 730 via an input interface 780 and the internal bus system 716.

The processor 730 and/or the co-processor 740, operating under the control of stored instructions (e.g., an application program), (i) determines the location of the sensor probe, (ii) converts the digitized sensor data to either a numeric value, or a graphical representation, for example, based on the input selection and parameter data entered by the user, (iii) modifies video data at and around (or in the vicinity of) the determined location based on the numeric value or graphical representation, and (iv) provides the composite video for display, video storage, and/or file storage. The processing sequence of the system of my invention is shown in FIG. 8 and explained with reference to FIGS. 9 through 11, 14 through 16, and 22 through 26, below.

Figure 8:
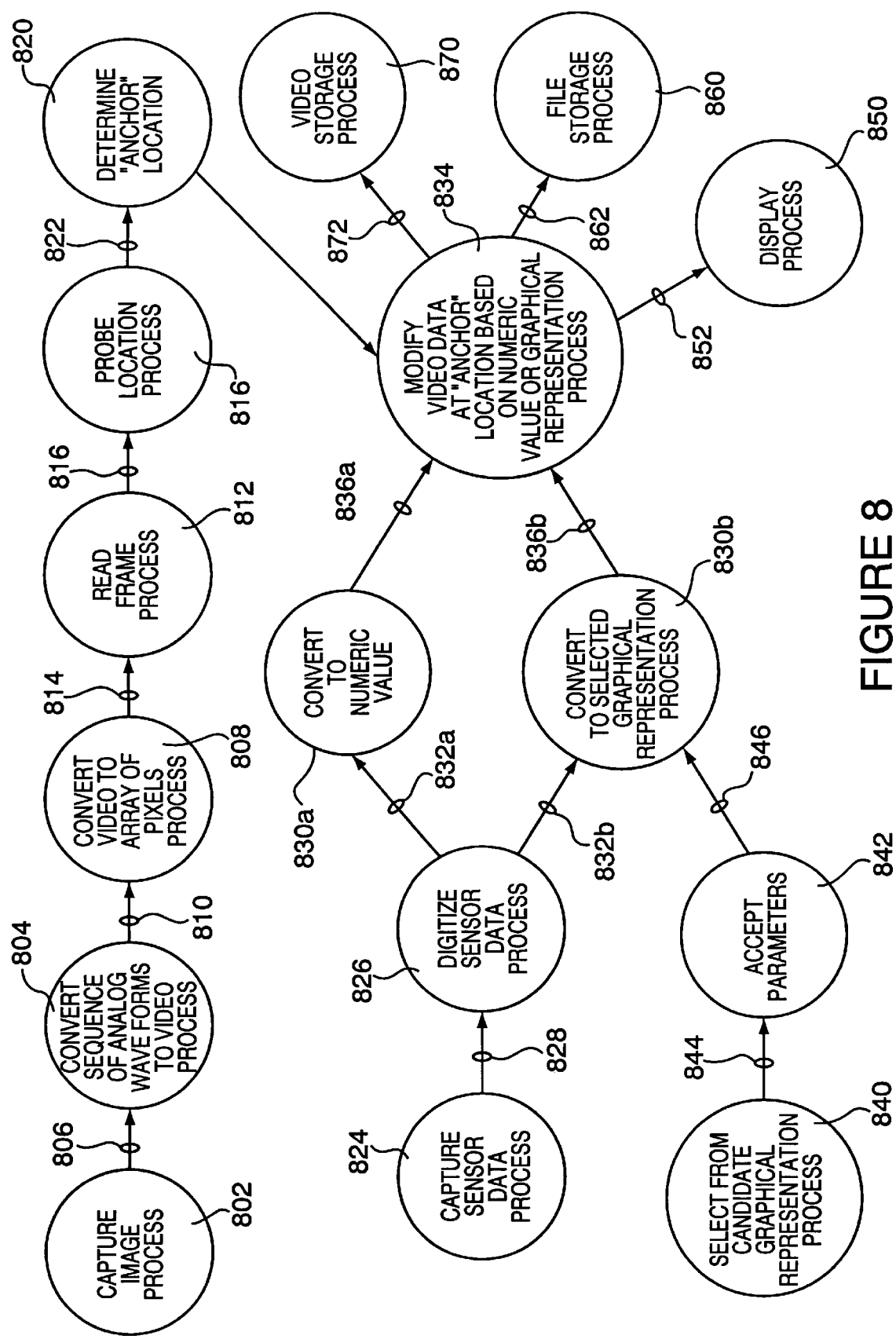
FIG. 8 is a processing and data flow diagram of the display system of FIG. 7.

FIG. 8 is a processing and data flow diagram of the display system of FIG. 7. First, a process 802 for capturing an image is performed. This process may be carried out by a videoimagescope 400 for example. Next, a process 804 for converting a sequence of analog waveforms, clocked out from a charge coupled device (or CCD) 452 for example, to a video signal is performed. This process may be carried out by the camera control unit 710 for example. If a borescope 200 or fiberscope 300, with an attached video camera is used, the processes 802 and 804 are replaced with a capture image and convert optical image to video process steps.

In either case, a process 808 for converting video to an array of pixels is then performed. This process may be carried out by the video frame grabber 712 for example. As shown in FIG. 22, a video frame 2200 includes x rows and y columns of pixels 2202. Thus, each frame includes x * y pixels. FIG. 23 illustrates an exemplary pixel data structure 2300. As shown, the pixel data structure 2300 may include a pixel identifier field 2302 and a pixel characteristic field 2310. The pixel identifier field 2302 may include an $n_1$ bit (e.g., 10-bit) row address field 2304 and an $n_2$ bit (e.g., 10-bit) column address field 2306. The pixel characteristics field 2310 may include an $n_3$ bit (e.g., 8-bit) color field 2312 and an $n_4$ bit (e.g., 8-bit) brightness field 2314.

Next, a process 812 reads frames of video. This process may be carried out by the processor 730 (or co-processor 740), under control of stored instructions, which may read frames 2200 of video from the video frame grabber 712 via internal bus system 716.

Then, a process 816 for determining a location of a probe or sensor 706 within the video frame is performed. This process may be carried out by the processor 730 and/or the co-processor 740 for example, operating under the control of stored instructions. An exemplary process 816 for determining the location of a probe or sensor 706 is illustrated in the flow diagram of FIG. 9.

In general, the probe is painted, labeled, or otherwise provided with a particular color. This color preferably provides a maximum contrast with the work piece being inspected. In a simplified method, the color field 2312 of each pixel 2202 of a frame 2200 is compared to the color used to code the probe. When the comparison yields a match (or a color difference within a certain threshold), the row and column address fields 2304 and 2306, respectively, provide the probe location. Although this simplified method will work, the exemplary process 816 for determining the location of a probe or sensor 706 illustrated in the flow diagram of FIG. 9, and discussed below, reduces processing time in most instances. In an alternative embodiment, the probe 1012 may be provided with an active element, such as a LED for example, rather than a label or paint.

Figure 9:
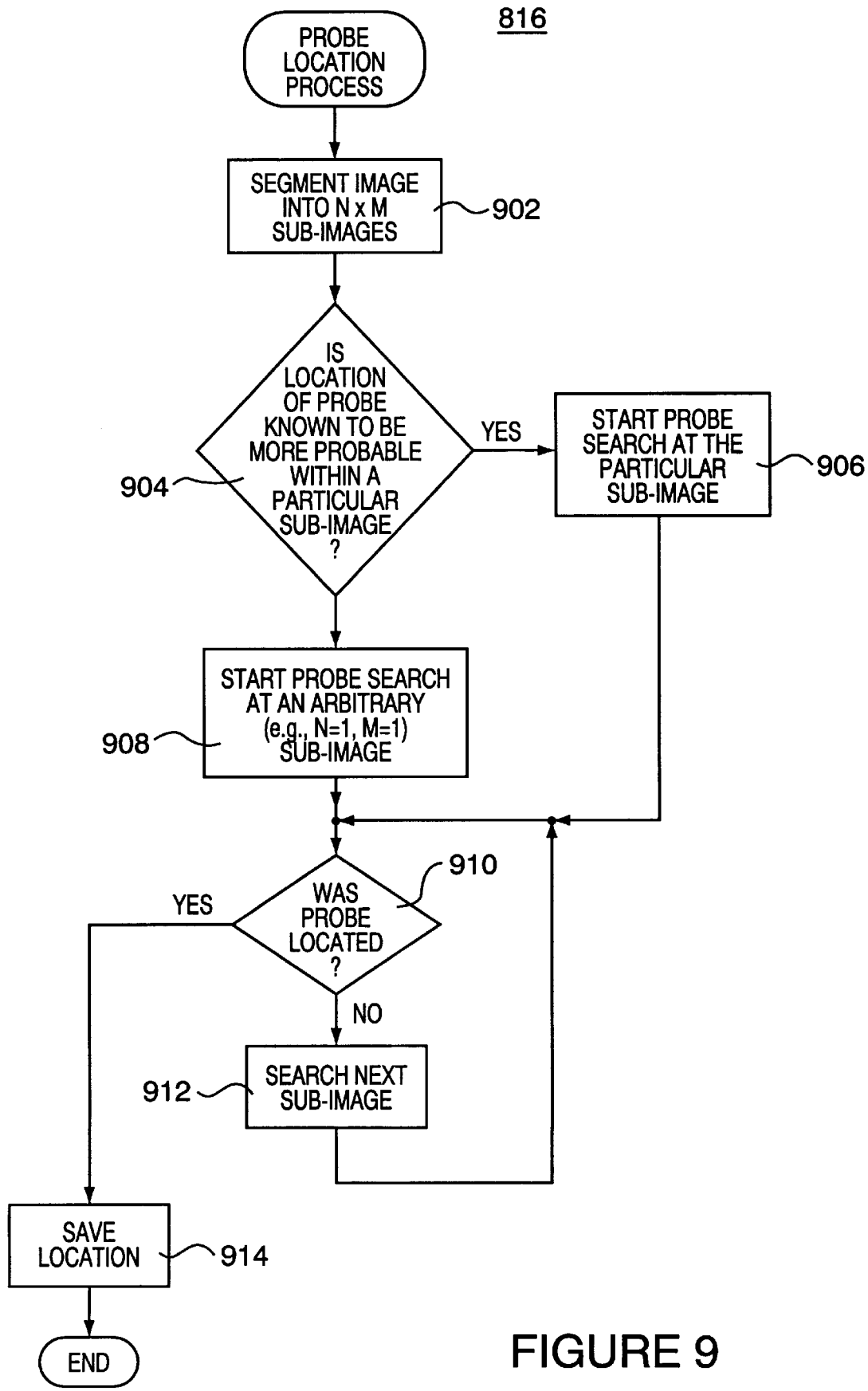
FIG. 9 is a flow diagram of a probe location process which may be used in the system of my invention.
Figure 10:
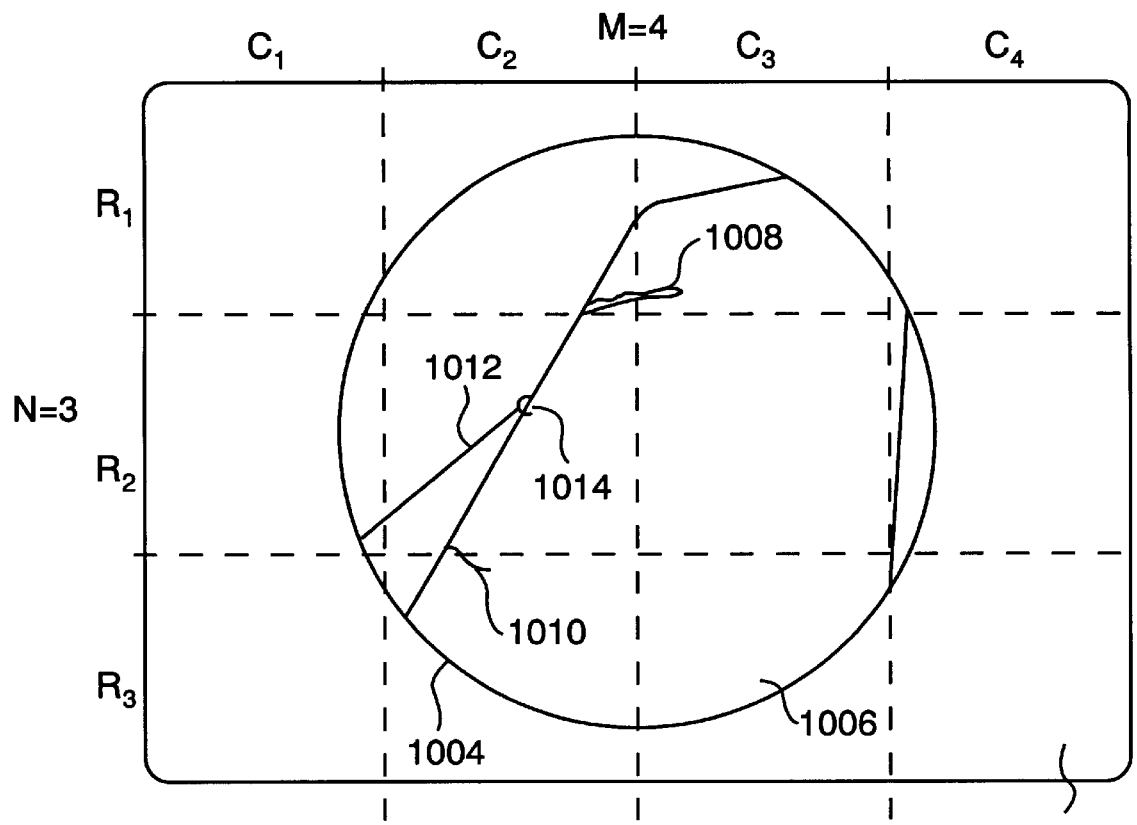
FIG. 10 illustrates a first segmentation scheme which may be used in the probe location process of the system of my invention.
Figure 11:
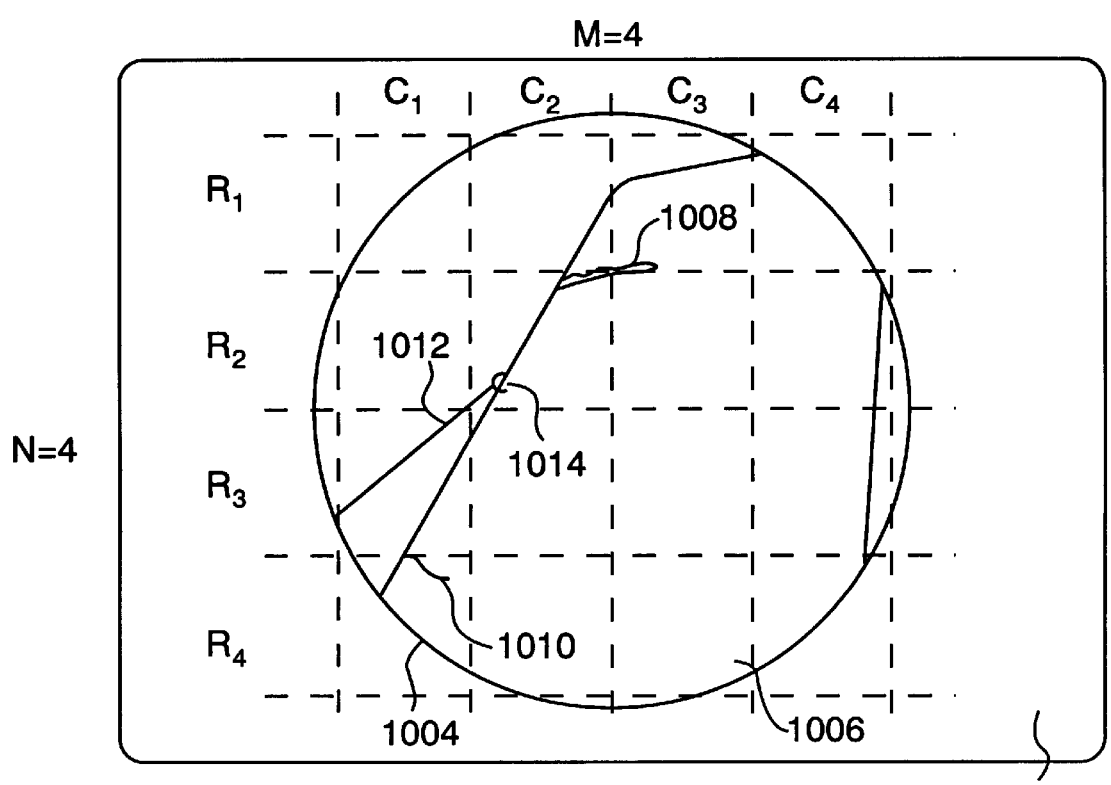
FIG. 11 illustrates a second segmentation scheme which may be used in the probe location process of the system of my invention.

In the exemplary probe location process 816 of FIG. 9, the image (or frame 2200) is first segmented into N by M sub-images (or regions). (See step 902.) For example, as shown in FIG. 10, the frame 1002 is segmented into 12 regions. The frame 1002 includes the field of view 1004 of the optical instrument. Within the field of view 1004, a work piece 1006, having a large defect 1008 and a small defect 1010, is shown, as is sensor 1012 having a probe which contacts the work piece 1006 at point 1014. FIG. 11 illustrates a refined frame segmentation process in which only the field of view 1004 is segmented. This refined process is advantageous because the probe of the sensor 1012 will almost always be within the field of view 1004 of the optical instrument, and in any event, the preferred system of my invention is most useful when the probe of the sensor 1012 is within the field of view 1004 of the optical instrument.

In either case, as shown in step 904, it is determined whether the location of the probe is known to be more probable within a particular one of the regions or sub-images. That is, if it is known (by the operator or by the processor 730 or co-processor 740) that the probe is likely to be at or near the center of the image, a search for the probe can start within sub-image(s) in which the probe is more likely to be located. This information can be entered by the user. This information may also be predetermined or learned (e.g., with a neural network), particularly if the system is used repetitively for similar types of inspections of similar work pieces. As shown in steps 904 and 906, if it is known that the probe is more likely to be within a particular sub-image than the others, a pixel by pixel search for the probe is commenced within the particular sub-image. Otherwise, as shown in steps 904 and 908, a pixel by pixel search is commenced within an arbitrary (e.g., N=1, M=1) sub-image.

In either case, if the probe is found within the particular sub-image, the location of the probe is saved. (See steps 910 and 914.) If, on the other hand, the probe is not found within the particular sub-image, a next, previously unsearched, sub-image is searched. (See steps 910 and 912.) Naturally, the process ends if each of the sub-images have been searched and the probe is still not found.

In an alternative embodiment, each sub-image may be further segmented. Moreover, other search methodologies, known to those skilled in the art, may be employed by the system of my invention to optimize the search for the probe location.

In a simplified embodiment, the sensor is fixed with respect to the field of view of the video source. In this case, the location of the sensor can be predetermined.

Returning now to FIG. 8, a process 820 for determining an "anchor" location is next performed. This process may be carried out by the processor 730 for example. Basically, when a match (or a color difference within a predetermined threshold) between the color of the probe and one or more pixels of the read frame is determined, the pixel identifier 2302 information is stored for later use as an anchor for locating the display of a numerical or graphical representation of the sensor data. If a more than one pixel (e.g., a cluster of pixels) of the read frame match the color of the probe, the "anchor" location may be defined by the pixel identifier 2302 information of an arbitrary one of the matching pixels, but is preferably an average of the pixel identifiers. For example, row and column addresses 2304 and 2306 of the pixels of the cluster may be averaged to determine a "center" of the cluster.

Independent of the above described processes, the following processes are also performed. First, a process 824 for capturing sensor data is performed. This process may be carried out by a sensor (data processor 720), such as an eddy current probe or an ultrasound probe for example, which converts a sensed physical phenomena (e.g., magnetic field, charge, current, voltage, pressure, temperature, radiation, sound, etc.) into a signal, such as an analog electrical signal. Next, process 826 digitizes the signal. This process may be carried out by the analog to digital converter 722 for example.

The digitized signal may be processed in the one (or more) of the following ways. In either case, the digitized signal is made available to the processor 730 (or co-processor 740) via internal bus system 716. In a first case, a process 830*a* for converting the digitized signal to a numeric value is performed. This process may be carried out by the processor 730 using a conversion algorithm or lookup table. In a second case, a process 830*b* for converting the digitized signal to a (non-obtrusive) graphical representation is performed. This process may be carried out by the processor 730 using a lookup table or based on a graphical representation generation algorithm using predetermined or user defined parameters for example.

Figure 14:
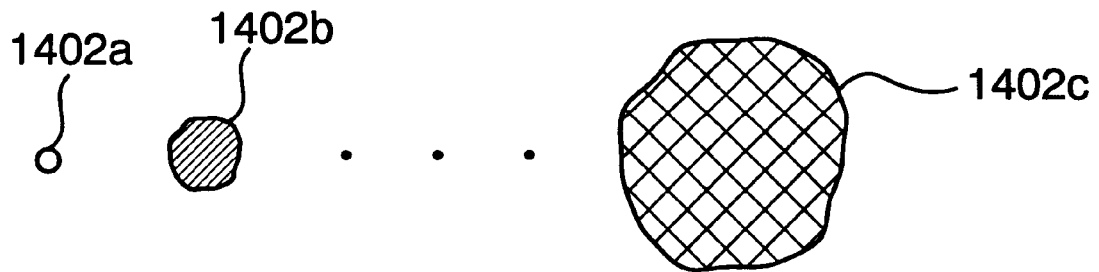
FIG. 14 illustrates examples from a first set of non-obtrusive graphical representations which may be used in the display system of my invention.
Figure 15:
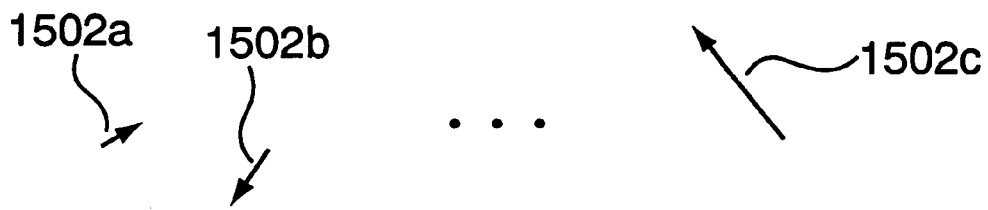
FIG. 15 illustrates examples from a second set of non-obtrusive graphical representations which may be used in the display system of my invention.
Figure 16:
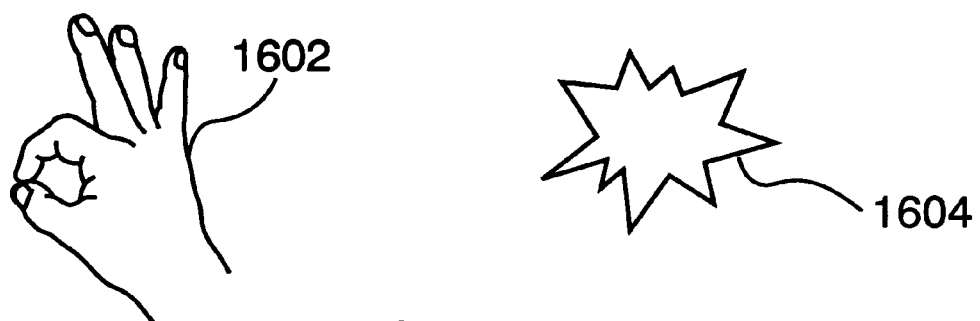
FIG. 16 illustrates a third set of non-obtrusive graphical representations which may be used in the display system of my invention.

In the second case, the graphical representation may be selected and modified by a user. FIGS. 14 through 16 illustrate examples of some graphical representations. Specifically, FIG. 14 illustrates a cloud graphical representation 1402 having an input dependent size and color (and brightness and sharpness). More specifically, the size of the cloud may depend on a first sensor output (e.g., eddy current magnitude) and the color (or brightness) of the cloud may depend on a second sensor output (e.g., eddy current phase). Alternatively, these or other characteristics of the cloud may vary based on sensor outputs in accordance with user selections, discussed below. If the central portion of the cloud graphical representation 1402 is omitted, a halo graphical representation results. The halo graphical representation is preferable in that it is even less obtrusive—a user can view the video image through the central opening of the halo. FIG. 15 illustrates an arrow graphical representation 1502 in which the size of the arrow may depend on a first sensor output (e.g., eddy current magnitude) and the direction of the arrow may depend on a second sensor output (e.g., eddy current phase). FIG. 16 illustrates an example of pass/fail graphical representations wherein a first graphical representation 1602 is used to indicate a pass condition and a second graphical representation 1604 is used to indicate a fail condition.

If the system provides more than one type of graphical representation, process 840 is performed to allow a user to select from a number of candidate graphical representations. This process may be carried out by the processor 730 executing an application program, an output device (e.g., VGA display 762) providing options to a user (e.g., via a menu or graphical user interface), and an input device 782 (e.g., a keyboard, keypad, mouse, track ball, etc.) and interface 780 for accepting a user selection. In any event, once a graphical representation is selected, process 842 permits the user to define the parameters of the graphical representation. For example, if, after being presented with a number of graphical representations to choose from, a user selects the cloud graphical representation 1402, the processor 730, via an output device, will prompt the user for parameter information pertinent to the cloud graphical representation. For example, the user may be prompted for the minimum and maximum sizes of the cloud, a first sensor output to correspond to the size of the cloud, a first output-to-cloud size scale factor, a color range, a second sensor output to correspond to the cloud color, a second output-to-cloud color translation, a minimum and maximum brightness, a third sensor output to correspond to the cloud brightness, and a third output-to-cloud brightness translation. Otherwise, default parameter values may be used. These selections and parameters are used by the process 830b for converting the digitized sensor data to a selected graphical representation.

Next, process 834 modifies video (or frame) data at and around (or in the vicinity of) the anchor location based on either (a) a display of the numeric value or (b) a display of the graphical representation. (The modification may be offset from the anchor location such that, in a resulting display, the offset would be readily perceived visually by a user. However, the modification is preferably centered at the anchor location, or alternatively, offset from the anchor location such that, in a resulting display, the offset would not be easily perceived visually by a user.) This process is carried out by the processor 730 and/or co-processor 740. Modifying the video frame may include (a) replacing pixels of video data in a vicinity of the anchor location with a numeric value or graphical representation or (b) overlaying pixels of video data in a vicinity of the anchor location with a numeric value or graphical representation.

In the overlaying process, pixel characteristics (e.g., color) of the video data and pixel characteristics (e.g., color) of the numeric value or graphical representation are combined. The pixel characteristics may be weighted before combination. For example, if the weight assigned to the pixel characteristics of the video data is much greater than the weight assigned to the pixel characteristics of the graphical representation, the graphical representation will almost be transparent, providing a "ghost" image on the video frame. If, on the other hand, the weights assigned to the pixel characteristics of the video data and graphical representation are comparable, the graphical representation will appear as a translucent image on the video frame. Lastly, if the weight assigned to the pixel characteristics of the video data is much less than the weight assigned to the pixel characteristics of the graphical representation, then the graphical representation will almost appear to replace the pixels of video data in a vicinity of the anchor location.

Figure 27A:
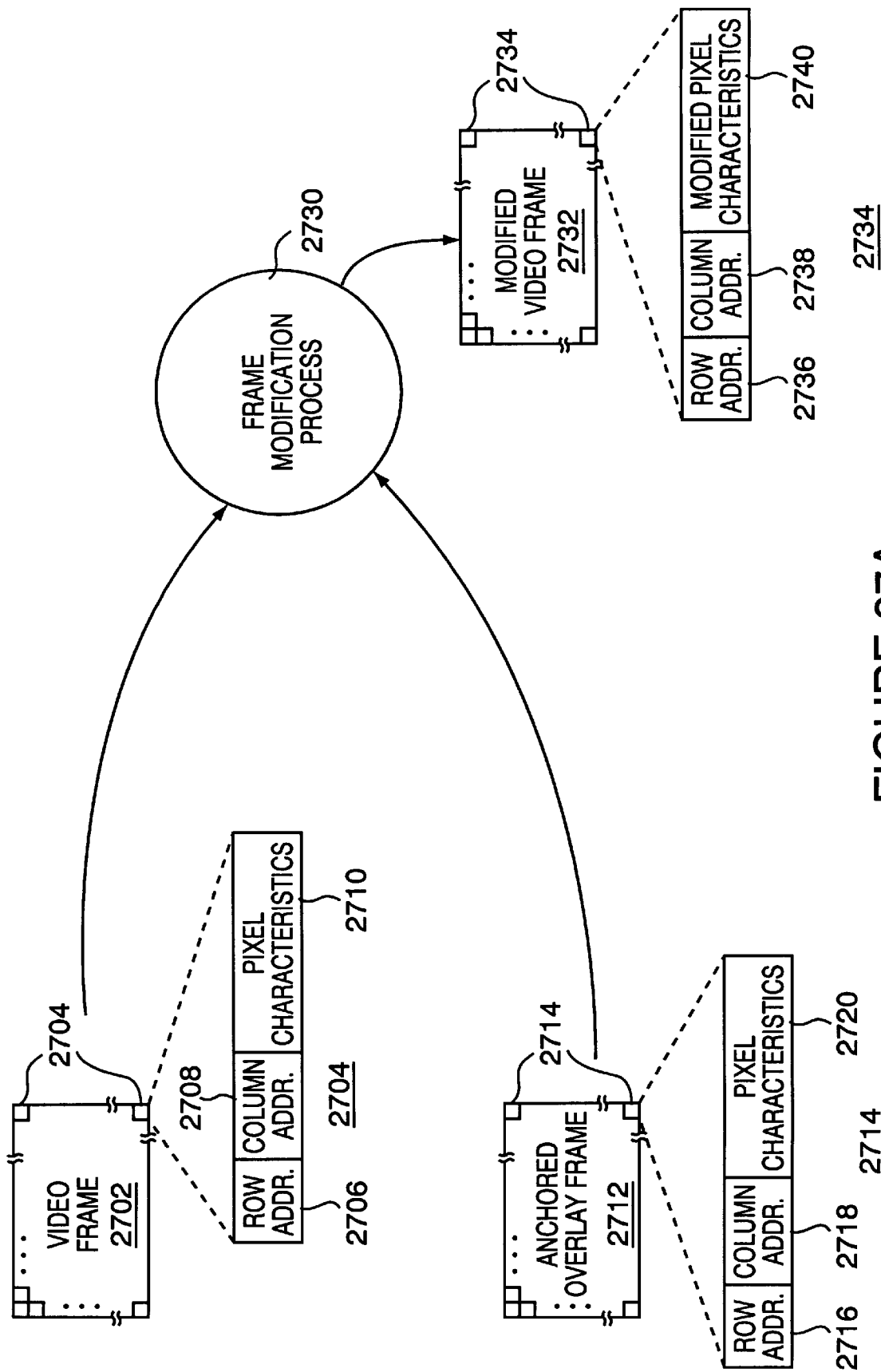
FIGS. 27a and 27b illustrate ways in which pixels of a video frame may be modified.
Figure 27B:
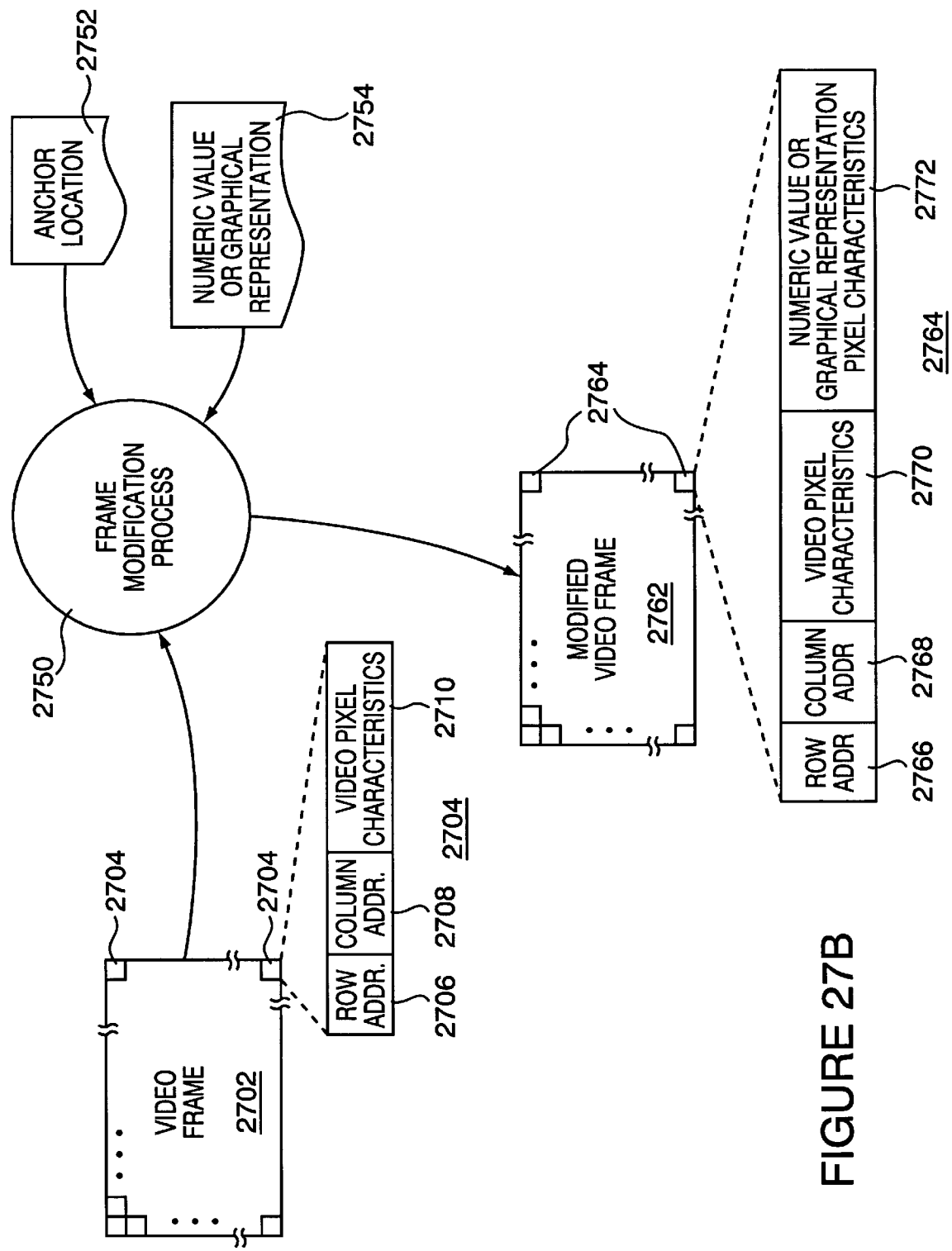

FIGS. 27a and 27b illustrate two ways in which the pixels 2704 of a video frame 2702 may be modified. As shown in FIG. 27a, a video frame 2702 and an anchored overlay frame 2712 may be provided to a frame modification process 2730. The video frame 2702 includes rows and columns of pixels 2704. Data corresponding with each pixel 2704 may include a row address 2706, a column address 2708, and pixel characteristics (e.g., color, brightness, etc.) 2710. Similarly, the anchored overlay frame 2712 includes rows and columns of pixels 2714. Data corresponding to each of the pixels 2714 may include a row address 2716, a column address 2718, and pixel characteristics (e.g., color, brightness, etc.) 2720.

Basically, the anchored overlay frame 2712 includes a numeric value or graphical representation in a vicinity of a determined anchor location. The pixel characteristics 2720 of pixels 2714 of the graphical overlay frame 2712 other than those of the numeric value of graphical representation will have a null value such that, when the frame modification process 2730 modifies the pixel characteristics 2710 of a video frame pixel 2704 based on null value pixel characteristics 2720 of a pixel 2714, the pixel characteristics 2710 of the video frame pixel 2704 are unchanged.

Referring back to FIG. 7, the frame modification process 2730 may be carried out by the processor 730 and/or the co-processor 740. The frame modification process 2730 generates a modified video frame 2732 including rows and columns of pixels 2734. Data corresponding to each of the pixels 2734 may include a row address 2736, a column address 2738, and modified pixel characteristics 2740. The modified pixel characteristics 2740 are based on the pixel characteristics 2710 of the video frame pixels 2704 and the pixel characteristics 2720 of the anchored overlay frame 2712. As discussed above, "modifying" pixels of the video frame may result in (a) replacing pixels of video data in a vicinity of the anchor location with the numeric value or graphical representation, or (b) overlaying pixels of video data in a vicinity of the anchor location with the numeric value or graphical representation.

As shown in FIG. 27b, an alternative frame modification process may be provided with a video frame 2702, anchor location data 2752 (e.g., from process for determining anchor location 820), and data corresponding to a numeric value or graphical representation 2754 (e.g., from process 830a or 830b). As was the case above, the video frame 2702 includes rows and columns of pixels 2704. Data corresponding to each of the pixels 2704 may include a row address 2706, a column address 2708, and video pixel characteristics 2710. Based on the video frame 2702, the anchor location data 2752, and the data corresponding to the numeric value or graphical representation 2754, the frame modification process 2750 generates a modified video frame 2762. The modified video frame 2762 includes rows and columns of pixels 2762. Data corresponding to each of the pixels 2762 may include a row address 2766, a column address 2768, video pixel characteristics 2770, and pixel characteristics of the numeric value or graphical representation 2772. The video pixel characteristics 2770 may be the same as the video pixel characteristics 2710. The pixel characteristics of the numeric value or graphical representation 2772 are based on the anchor location data 2752 and the data corresponding to the numeric value or graphical representation 2754. A display process (not shown) combines the video pixel characteristics 2770 and the pixel characteristics of the numeric value or graphical representation 2772 to form a modified display frame. Referring back to FIG. 7, the display process may be carried out by an appropriately configured display controller 760.

Finally, the new image is provided to (a) a video storage process (e.g., carried out by a video tape recorder 790), (b) a file storage process (e.g., carried out by a magnetic or optical disk drive and controller 750), and/or (c) provided to a display process (e.g., carried out by display controller 760 and VGA display 762 and/or display controller 760, VGA-to-NTSC converter 766, and NTSC display 768). Frames of stored video or of a stored file may be "tagged" so that they may be readily accessed for future viewing. Such "tagging" may be performed (a) manually, in response to a user input, (b) automatically, in response to a sensor output in excess of a threshold, or (c) in response to a user verification input to a prompt, automatically generated when the sensor output exceeds the threshold. Similarly, frames of stored video or of a stored file may be annotated with the comments of a user.

In a simplified, alternative, embodiment, the process 816 of determining a probe location is not performed and the anchor position is predetermined. Further, rather than modifying video data based on a numeric or graphical representation in process 834, the video data may be combined with the numeric or graphical representation in a known way, e.g., by means of mixer or picture-in-picture video processor. Picture-in-picture processing can be performed by a processor, without the need for an external mixer. Computer software generates the numeric or graphical representation within a window which can be positioned anywhere within the main image based on user configured controls. For example, FIG. 12 illustrates a display 1202 in which the video of the field of view 1204 of an optical instrument and a graphical representation 1252 of sensor 1212 data is provided in a split screen. More specifically, a work piece 1206 being viewed is inspected by eddy current probe 1212 which contacts the work piece at point 1214. The graphical representation 1252 conveys eddy current amplitude and phase information. Other information regarding sensor output and sensor settings 1254 may also be provided. FIG. 13 illustrates a display 1302 in which the video of the field of view 1304 of an optical instrument and a graphical representation 1352 of sensor 1312 data is provided as a picture-in-picture. More specifically, a work piece 1306 being viewed is inspected by eddy current probe 1312 which contacts the work piece at point 1314. The graphical representation 1352 conveys amplitude and phase information of sensed eddy currents. Other information 1354 may also be provided.

An enhanced embodiment of my invention permits profiles of a characteristic (e.g., eddy current phase and amplitude) of the work piece being inspected to be obtained. In this embodiment, the field of view of the optical instrument is fixed with respect to the work piece while the sensor is moved with respect to the work piece (and thus with respect to the field of view). For example, a sensor carried through the working channel of a rigid borescope 200 may be articulated remotely. The graphical representations based on the digitized signal(s) from the sensor are periodically stored based on a clock or stored from time-to-time based on a user selection.

Figure 17:
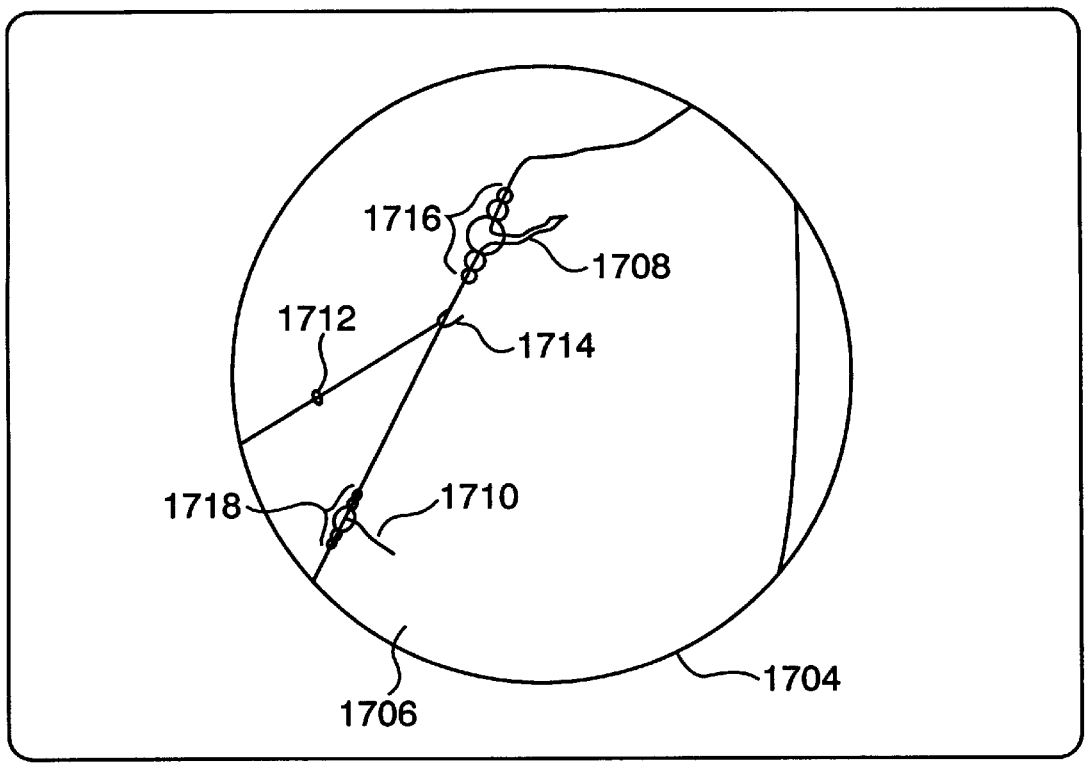
FIG. 17 illustrates an example of a display of a work piece having graphical representations based on a sampled sequence of data.

FIG. 17 illustrates an example of a display 1702 of a work piece 1706 (e.g., a turbine blade have a leading edge and a trailing edge) having cloud graphical representations 1402 which are based on the digitized signal(s) at various times. The display 1702 depicts an eddy current profile, i.e., a graphical map depicting the overall eddy current response of the work piece 1706. In this example, the profile includes a compilation of a number of "clouds" superimposed over the image of the work piece 1706. The eddy current probe 1712 is moved along the leading edge of the work piece 1706. The cloud graphical representations 1402 are periodically saved automatically, based on a clock, or saved from time-to-time, based on user inputs. In this example, the size of the cloud graphical representation is based on the magnitude of the sensed eddy current and the color of the cloud graphical representation is based on the phase of the sensed eddy current. As shown in FIG. 17, a first grouping of overlapping cloud graphical representations 1716 is captured adjacent to large crack 1708. The magnitude of the eddy current, and thus, the size of the cloud graphical representations, increase as the probe 1712 approaches the crack 1708 and decreases as the probe 1712 leaves the crack 1708. Although not shown in FIG. 17, the color of the cloud graphical representation also changes as the phase of the eddy current changes. Similarly, a second grouping of overlapping cloud graphical representations 1718 is captured adjacent to small crack 1710. With this system, after the eddy current sensor 1712 has moved along the leading edge of the turbine blade 1706, the series of cloud graphical representations provide a profile of the eddy current that can be readily assimilated and interpreted by an inspector.

Alternatively, an inspection profile may be generated in three (3) basic steps; namely: (1) initiate profile; (2) build profile; and (3) complete profile. First, a specific view of the work piece to be inspected is determined. This view will be fixed for the entire profile generation process. That is, the optical instrument is fixed with respect to the work piece during the entire profile generation process. However, a sensor may be moved with respect to the work piece. In response to an initiate profile command, a reference image is captured. More specifically, a video frame of the work piece in the fixed field of view, without the sensor in view, is captured and stored (e.g., on hard drive 750) as a reference image file. Under live video operations, the sensor is moved with the respect to the work piece. In response, the numeric or graphical representations corresponding to the sensor output are displayed.

In response to a build profile command, the then existing numeric or graphical representation is stored (e.g., on hard drive 750) in an overlay file. Subsequent numeric or graphical representations may be stored (e.g., appended to the overlay file or stored in separate file(s)) in response subsequent build profile commands.

A complete profile command associates or combines the reference image file with the overlay file(s) to form a profile file group or profile file.

Figure 18:
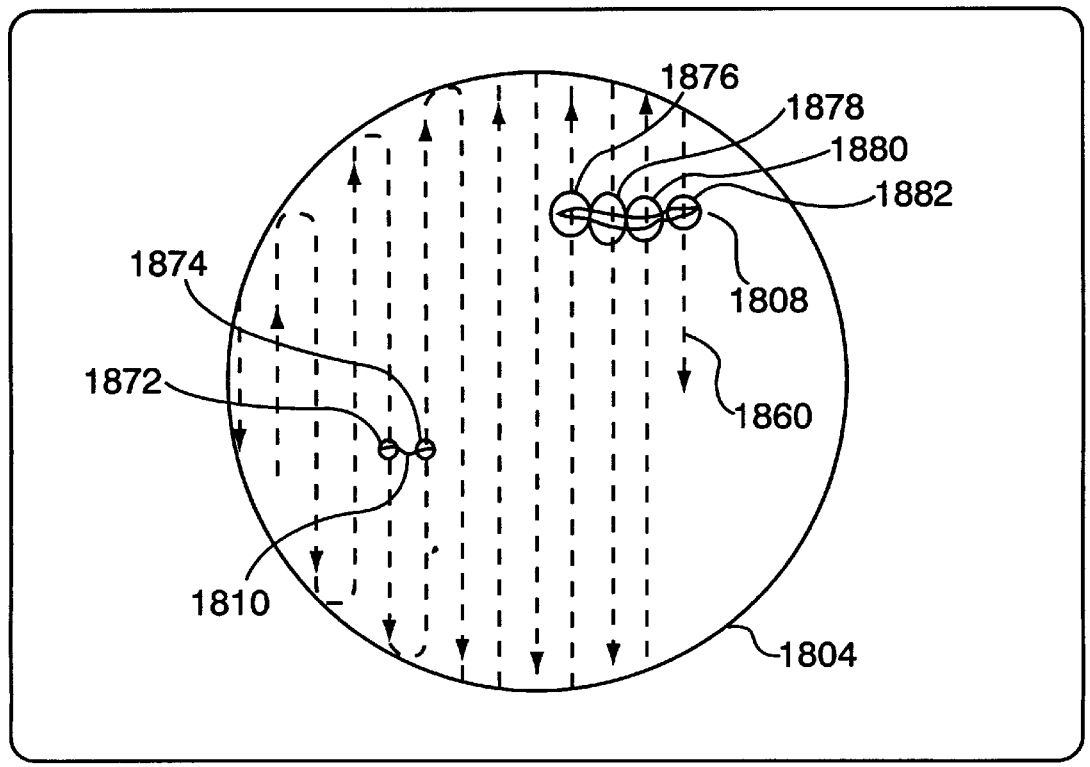
FIG. 18 illustrates an example of a display of work piece having graphical representations based on a matrix of data sampled during a scan of the work piece.

FIG. 18 illustrates an example of a display of work piece having graphical representations of sampled data from a scan of the work piece. In this example, the field of view 1804 is entirely filled with a view of the work piece. Further, in this case, the sensor is articulated, e.g., with miniature stepper motors (which may be remotely controlled) in a scan pattern 1860. In this case, the cloud graphical representations are periodically saved, for example, with each step of the stepper motor(s). Here, the small crack 1810, which causes an increase in the magnitude of the eddy current, is indicated by relatively small clouds 1872 and 1874. Similarly, the larger crack 1808 is indicated by larger clouds 1876, 1878, 1880 and 1882. Although not shown in FIG. 18, the color of the cloud graphical representation also changes as the phase of the eddy current changes. Again, the matrix of cloud graphical representations provide a profile of the eddy current that can be readily assimilated and interpreted by an inspector.

An example of the operation of the system of my invention is set forth below. In the following example, a white turbine blade is inspected by means of a videoimagescope 400 and an eddy current sensor. The eddy current sensor is provided with a red label at its probe tip.

Figure 24:
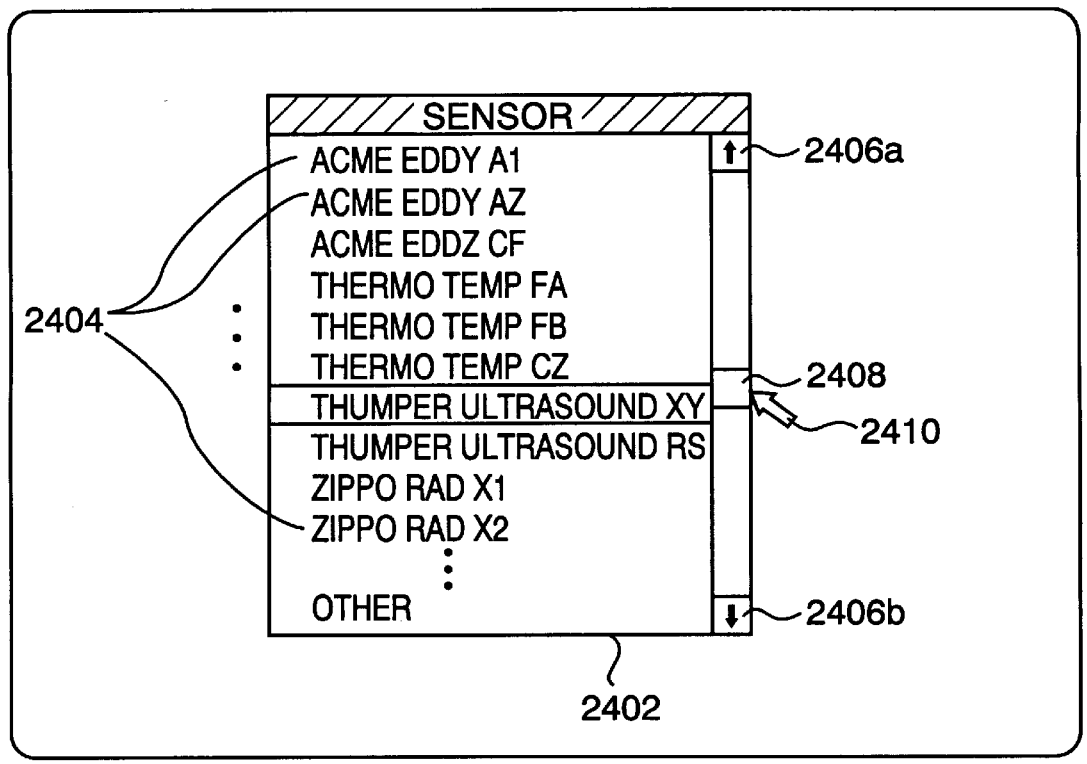
FIG. 24 illustrates a sensor selection window.

A user invokes execution of the remote inspection program executed by the system of my invention. In response, the user is first presented with a menu of candidate sensors. For example, the system of my invention may include data translation tables for certain predetermined sensors, such as selected models of eddy current probes and ultrasound detectors for example. FIG. 24 illustrates a display 2400 of a sensor selection window 2402. The window 2402 lists candidate sensors 2404, as well as an "other" candidate for instances in which the sensor to be used is not among those listed. The user may (a) double-click onto a displayed candidate sensor 2402, or (b) scroll through the candidate sensors by activating up and down scroll buttons 2406a and 2406b, or by dragging slider 2408 with arrow 2410. In this instance, the user selects the eddy current probe which will be used with the videoimagescope. Again, if the sensor being used is not included in the list of predetermined sensors, the user may select an "other" sensor and enter relevant data regarding the output response of the sensor.

Figure 25:
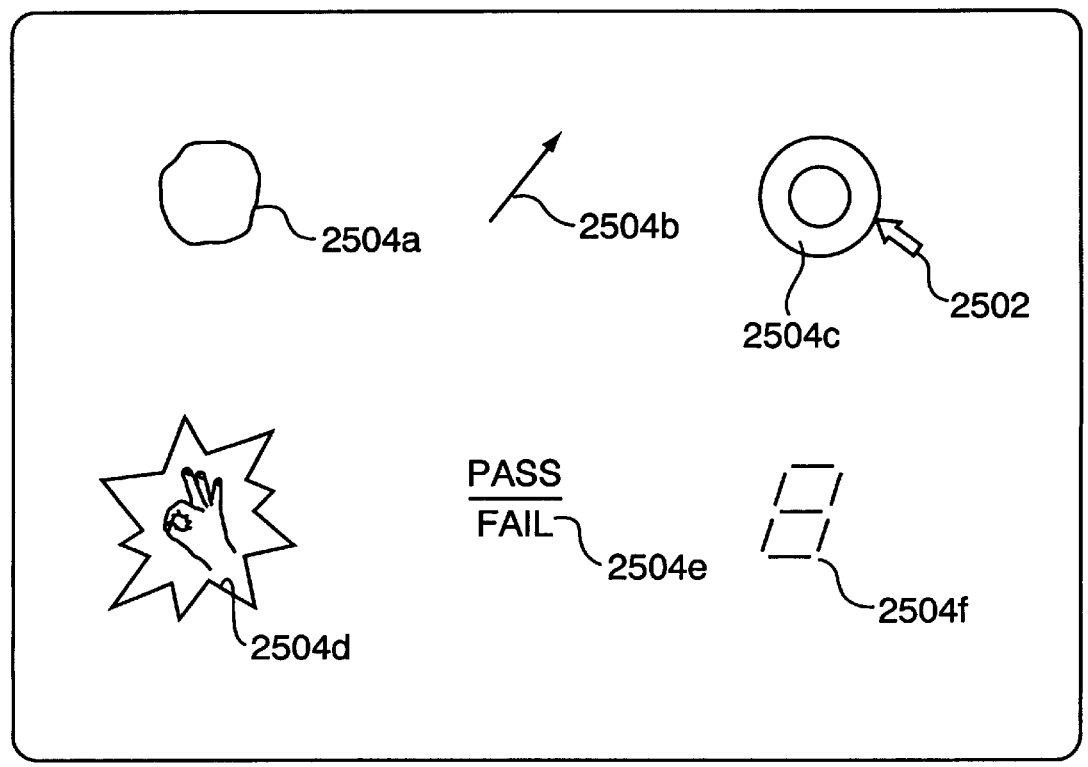
FIG. 25 illustrates a display selection window.

Next, the user is presented with a menu or graphical user interface through which they can select from among a group of candidate graphical representations. FIG. 25 illustrates a display 2500 of candidate graphical representations 2504 which include, for example, a cloud graphical representation 2504a, an arrow graphical representation 2504b, a halo graphical representation 2504c, an "OK-NOT OK" graphical representation 2504d, a "PASS-FAIL" graphical representation 2504e, and a numerical display 2504f. In this example, the user selects a halo graphical representation.

Figure 26:
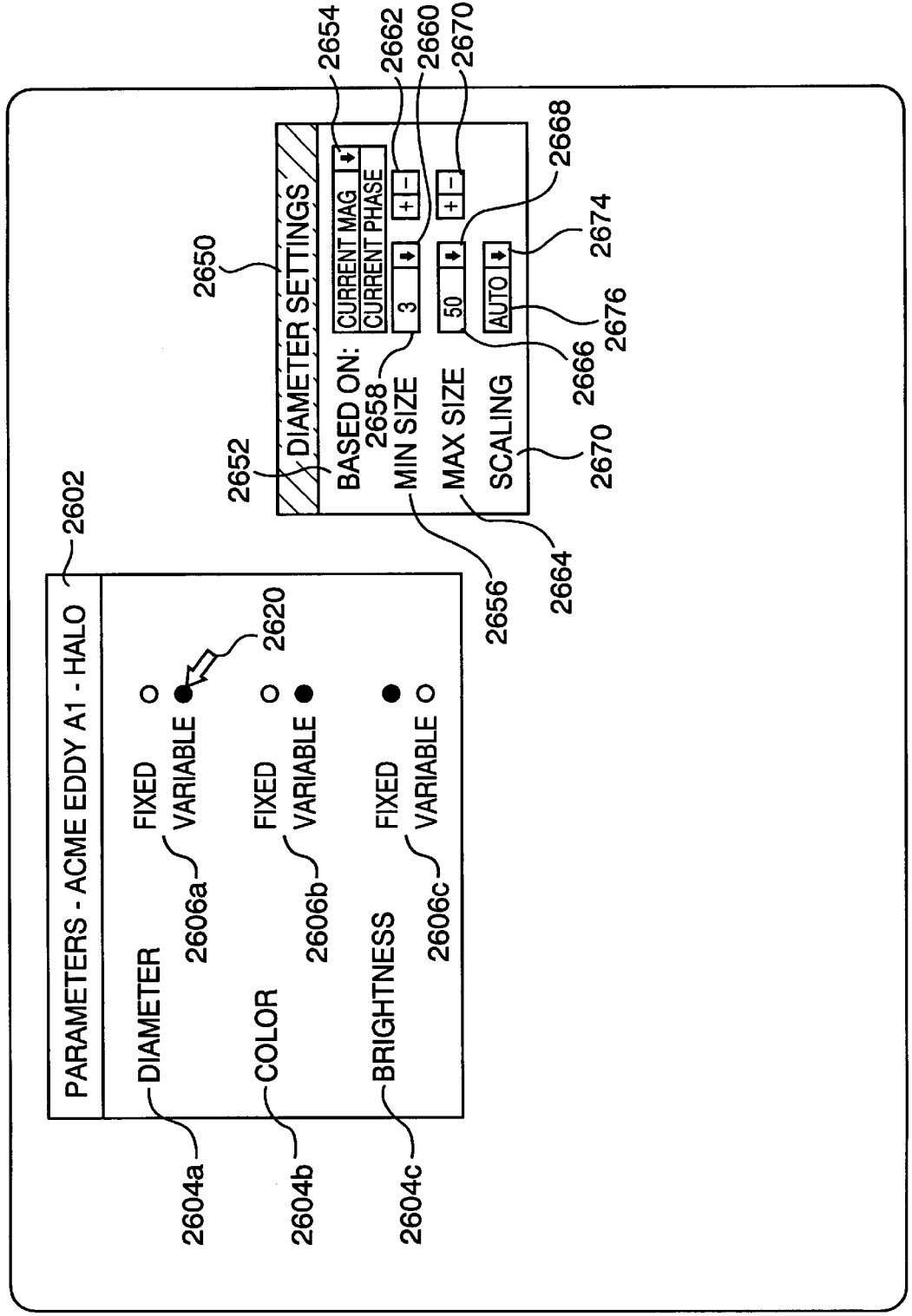
FIG. 26 illustrates a graphical user interface for user selection of graphical representation parameters.

The user is then prompted for parameters for the halo graphical representation. Alternatively, rather than input a group of parameters, the user may accept predetermined parameters. In this example, the user selects predetermined parameters which, for example, assign the size of the halo to the eddy current magnitude, the maximum halo size to be 50 pixels in diameter, the minimum halo size to be 3 pixels in diameter, the current-to-pixel scaling factor to be 5 mA per pixel, the halo color to be constant, assigns the halo brightness to the phase of the eddy current, where minimum brightness corresponds to a phase angle of 180 degrees, and maximum brightness corresponds to a phase angle of 0 degrees. On the other hand, as shown in FIG. 26, the user may define pertinent parameters 2604, presented in a parameter window 2602, to be either "FIXED" or "VARIABLE" 2606. If the parameter 2604 is selected as being variable, a setting window 2650 is provided. Based on the type of sensor 2404 selected by the user, the sensor output, upon which the variable parameter is based, 2652 is selected. Button 2654 provides a drag-down menu of sensor outputs, in this case, eddy current magnitude and eddy current phase. Other parameters 2656, 2664 may be (a) entered in box 2658, 2666, (b) selected from a drag-down menu 2660, 2668, and/or (c) incremented or decremented with buttons 2662, 2670. Parameter-to-sensor output scaling 2670 may be entered in box 2676 or selected from drag-down menu 2674.

The user may then insert the eddy current probe through the working channel 442 of the insertion tube 404 of the videoimagescope 400. The insertion tube 404 is then inserted, through inspection port 108 of jet motor housing 102 until a leading edge of a turbine blade 106 comes within the field of view 456 of the objective lens 450.

The image of the leading edge of the turbine blade 106 is focused, by objective lens 450, onto charge coupled device 452. Circuitry associated with the charge coupled device 452 clocks out the charges of the elements of the charge coupled device, and applies the resulting sequence of analog waveforms to line 454. At the same time, the user manipulates the eddy current probe such that a point of interest, an apparent crack in the turbine blade 106 for example, may be inspected.

As discussed above, the sequence of analog waveforms provided on line 454 are provided to the input of a camera control unit 710. The camera control unit 710 converts the sequence of analog waveforms into video frames which comply with the NTSC standard. The video frame grabber 712 receives the frames of NTSC video and converts the frames to a 1024 by 1024 array of pixels, each pixel having one of 256 colors and 256 brightness levels. The processor 730 (and/or co-processor 740) accesses a video frame 2200.

In this example it is known that the displayed field of view of 1004 is 800 by 800 pixels. As illustrated in FIG. 11, the processor 730 (and/or co-processor 740) segments the 800 by 800 pixel area of interest into four (4) rows and four (4) columns, thereby defining sixteen (16), 200 pixel by 200 pixel, sub-images. From past experience, it is known that the probability of finding the tip of the probe of the eddy current sensor in the second or third rows ($R_2$ or $R_3$) of the segmented image is more likely than finding it elsewhere. Accordingly, a pixel by pixel search, of the 200 by 200 pixel sub-image defined by the first column $C_1$ and the second row $R_2$, for dark blue pixel(s) is performed. Since the label is not within this sub-image, no red pixels are found. Thus, the next sub-image, defined by the second column $C_2$ and the second row $R_2$, is searched. In this case, red pixels, corresponding to the label of the tip of the probe of the eddy current sensor, are detected. The pixel identifier 2302 information corresponding to the first red pixel detected is stored as an anchor point.

Simultaneous with the above processing, the eddy current sensor produces a current signal which is converted to a current magnitude signal and a current phase signal. These two signals are provided to analog to digital converter(s) 722. The outputs of the analog to digital converter(s) 722 are read by processor 730. The processor, using a conversion table or graphical representation generation algorithm, determines the size and brightness of the halo graphical representation based on the magnitude and phase (as well as default or user defined parameter values), respectively, of the digitized eddy current signals. The resulting halo graphical representation is written over pixel information in the video frame 2200 around the determined anchor point.

The above processing is repeated for each video frame 2200. The resulting video frames 2200' are (a) presented to the user via video VGA display 768 or NTSC display 762, (b) stored as a file in a magnetic or optical storage medium 750, and/or (c) recorded onto video tape 790.

Enhancements and special adaptations of my invention are now set forth below.

Figure 19:
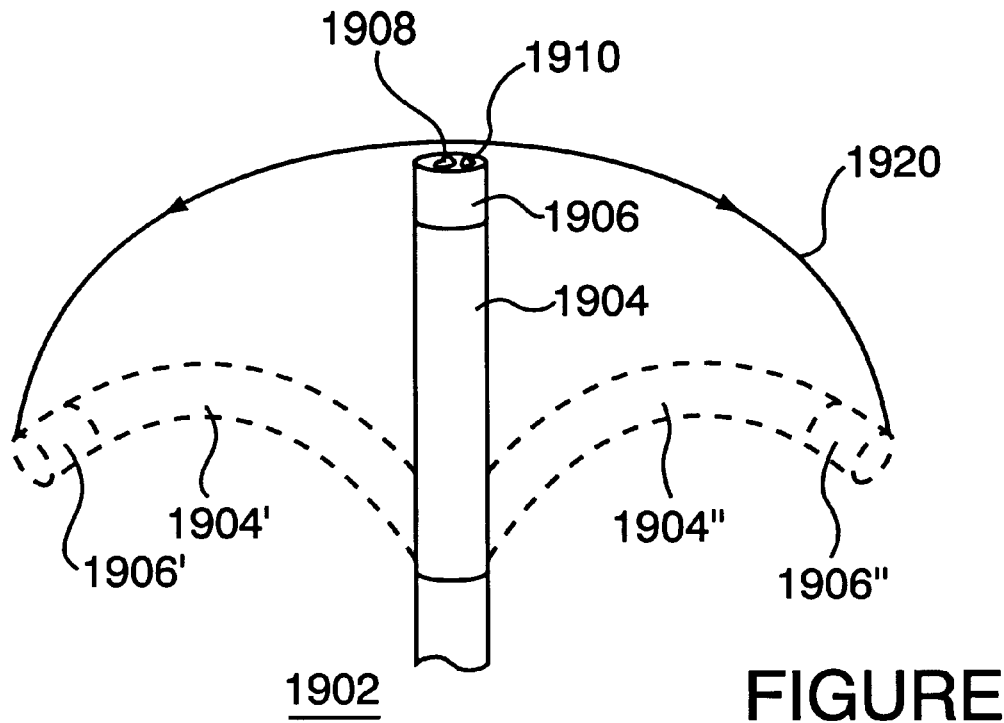
FIG. 19 illustrates the articulation, in an up-down or left-right plane, of a conventional flexible fiberscope or videoimagescope.
Figure 20:
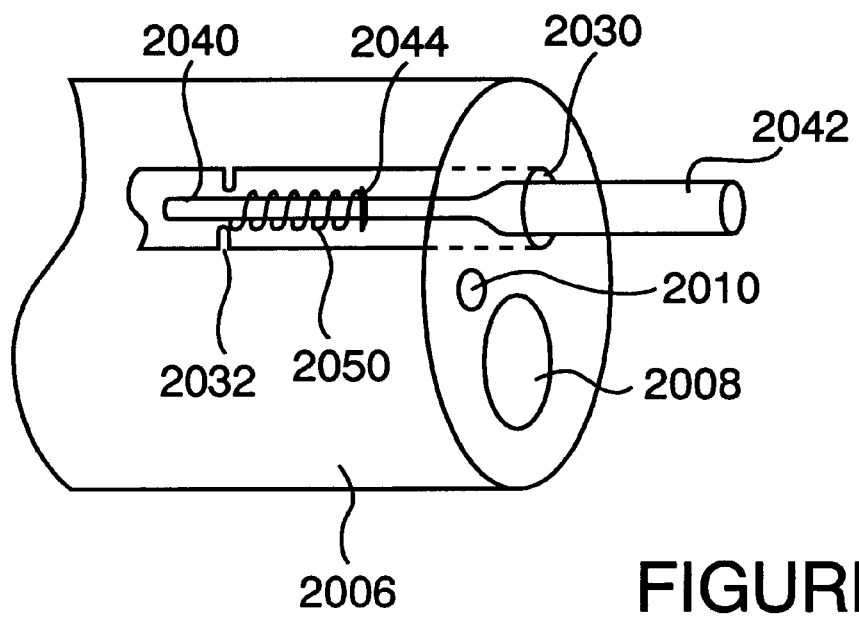
FIG. 20 illustrates an device for facilitating probe contact with a work piece throughout a predetermined articulation range.
Figure 21:
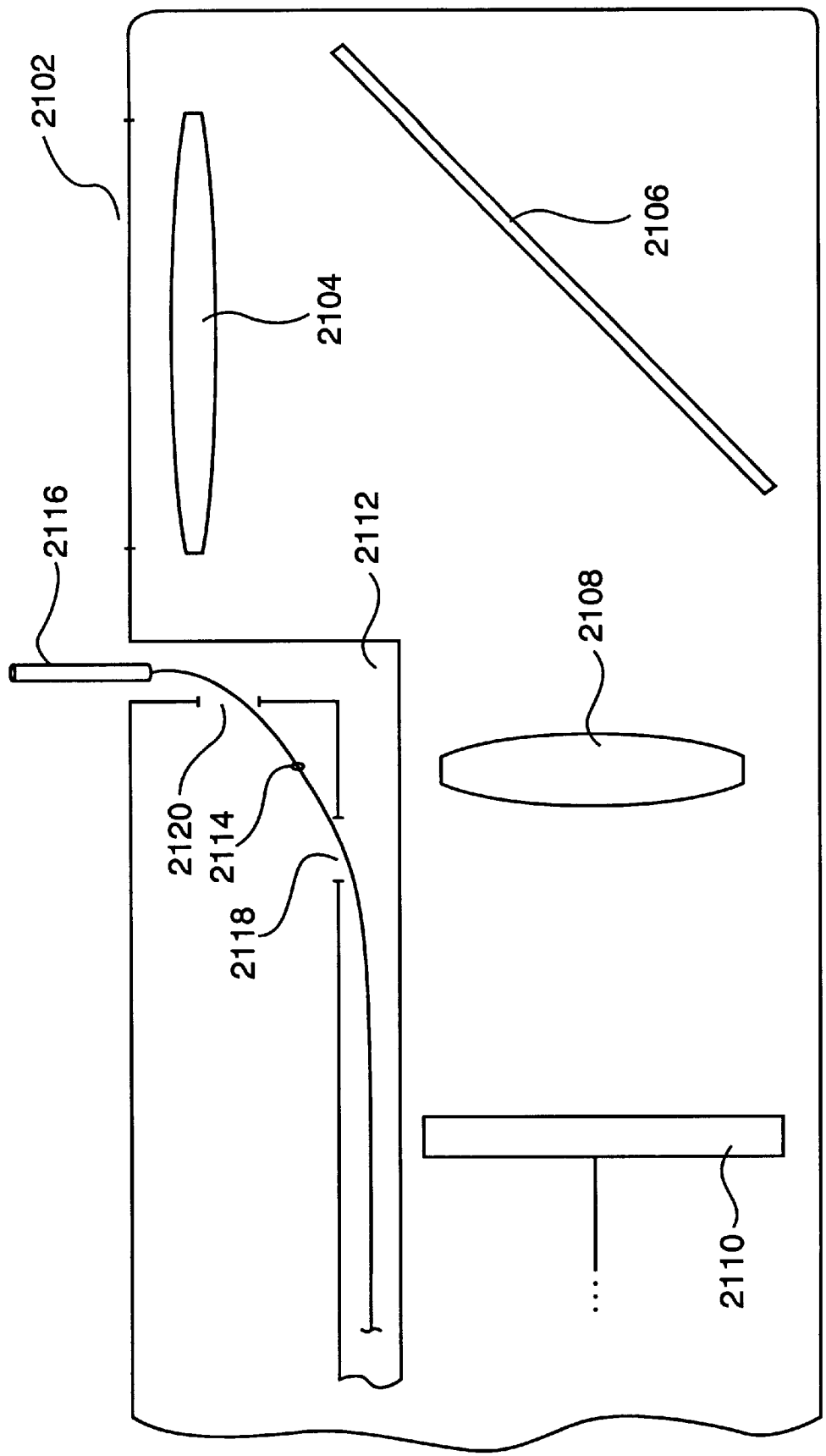
FIG. 21 illustrates the distal end of a 90 degree side view borescope, fiberscope, or videoimagescope, having a modified working channel.

Although the system of my invention may be used with any video source 704*d* and any sensor data source 706*d*, it is particularly well suited for use with flexible fiberscopes 300 or videoimagescopes 400 equipped with an eddy current probe. FIGS. 19 through 21 illustrate modifications made to known flexible fiberscopes 300 or videoimagescopes 400 for improving the quality of output signals of the eddy current probe.

FIG. 19 illustrates the articulation, in an up-down or left-right plane, of a conventional flexible fiberscope 300 or videoimagescope 400. More specifically, FIG. 19 illustrates the distal end 1904 of an insertion tube, including a tip adapter 1906. Lens 1908 and working channel 1910 are also shown (illumination means is not shown for clarity). Element 1904' illustrates the distal end of the insertion tube when it is articulated fully to the left, while element 1904" illustrates the distal end of the insertion tube when it is articulated fully to the right. As can be gleaned from FIG. 19, the distal end 1904 of the insertion tube moves in an arc 1920 when articulated left and right. The same is true for up and down articulation. If a flat work piece is being inspected, the eddy current probe would be closer to the work piece when in its non-articulated position and further from the work piece when fully articulated (either left, right, up or down.) Unfortunately, in such a case, the magnitude of the eddy current will vary based on the distance of the probe from the work piece rather than based solely on defects in the work piece.

FIG. 20 illustrates a device for facilitating probe contact with a work piece throughout a predetermined articulation range, thereby solving the above described problem. More specifically, the distal end 2006 of an insertion tube includes a lens 2008, an illumination window 2010, and a working channel 2030, through which an eddy current sensor 2040, having a probe 2042, extends. Preferably within with adapter tip, the working channel 2030 includes a protrusion(s) 2032, such as an annular ledge. A bias means 2050, such as a spring for example, is arranged between the protrusion(s) 2032 and a flange 2044 provided on the eddy current sensor 2040 thereby biasing the eddy current probe 2042 outward, away from the distal end of the insertion tube. In this case, the eddy current sensor 2040 is inserted into the working channel 2030 from the distal end. The outward biasing of the eddy current probe 2042 helps to ensure that the eddy current probe 2042 maintains contact with the work piece throughout the arc of a left, right, up, or down articulation. Other means for biasing the probe 2042 outward, away from the distal end of the insertion tube, may also be used, and may be located elsewhere in the remote visual inspection system.

Figure 1A:
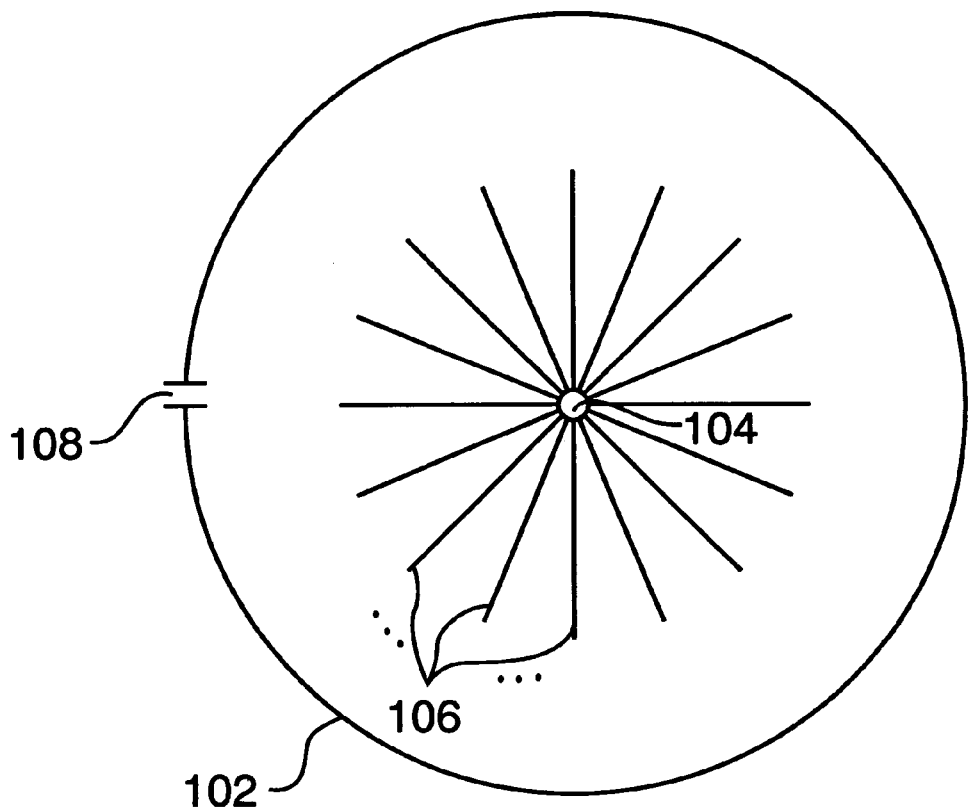
FIG. 1a illustrates remotely located work pieces which may be inspected with the display system of my invention and FIG. 1b illustrates a turbine blade which may be inspected with the display system of my invention.
Figure 1B:
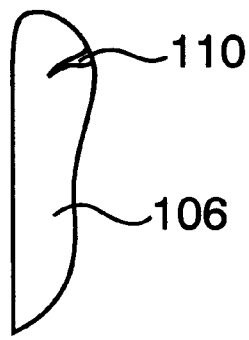
Figure 5:
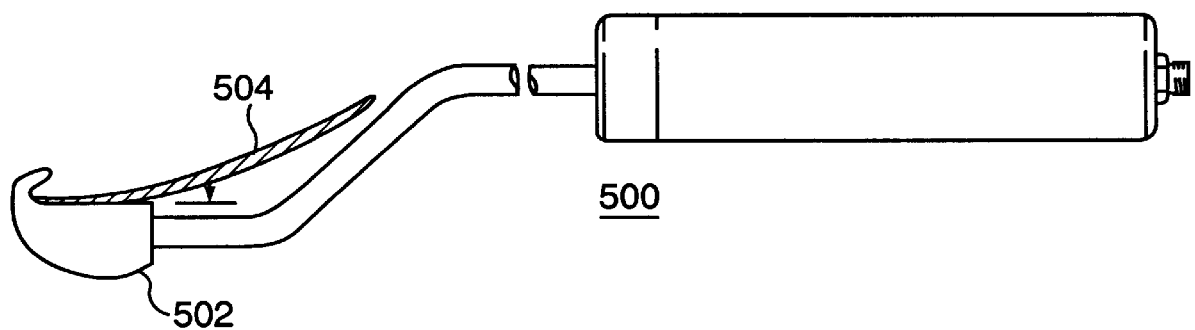
FIG. 5 illustrates a known eddy current sensor and a work piece.
Figure 6:
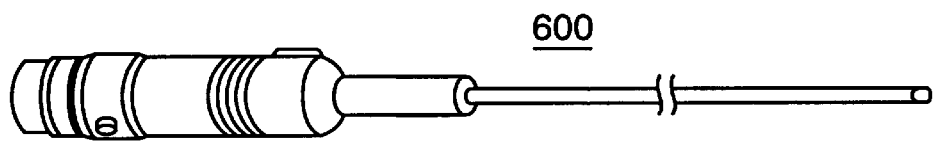
FIG. 6 illustrates a known ultrasound sensor.

FIG. 21 illustrates the distal end of a borescope, fiberscope, or videoimagescope having a 90 degree tip adapter with a specially modified working channel. Recall from FIG. 1*a* that turbine blades 106 are often inspected by an optical instrument having an insertion tube extending through an inspection port 108. To inspect the area of interest, i.e., the surface of the blade, a forward viewing tip adapter is not useful. In fact, 90 degree view tip adapters presently garnish the largest market segment for industrial remote visual inspection systems. As shown in FIG. 21, an image passing through the window 2102 is focused by lens 2104, reflected by mirror 2106 and focused by lens(es) 2108 onto a charge coupled device 2110 (or an end of a fiber bundle or an optical system) for example. Unfortunately, in many instances, the sensor 2114, having probe 2116, cannot achieve a tight bending radius. Accordingly, the working channel 2112 is provided with a first opening 2118, through which the sensor 2114 exits the working channel 2112, and a second opening 2120, through which the sensor 2144 re-enters the working channel 2112. Alternatively, a 90 degree tip adapter may be provided with a fixed probe.

Thus, the system of my invention provides an intuitive display which allows easy, almost instantaneous, assimilation and interpretation of data from multiple sources. The display is particularly useful for inspecting a work piece, and more specifically for inspecting a work piece with a remote visual inspection system. The system permits a scanning sequence or matrix having multiple sensor readings for a given field of view. Finally, my invention provides various modifications to known visual inspections systems to better sense data, such as eddy current data, particularly with side viewing adapter tips.

What is claimed is:

1. A method for processing
    video data which includes an image of a sensor, and
    data output by the sensor, the method comprising steps of:
    a) accepting analog video data;
    b) converting the analog video data to frames, each frame including data corresponding to an array of pixels;
    c) locating the image of the sensor in one of the frames to define an anchor location;
    d) accepting the data output by the sensor;
    e) digitizing the data output by the sensor to form digitized sensor data;
    f) converting the digitized sensor data to one of a numeric value and a graphical representation; and
    g) in the one of the frames, modifying pixels in a vicinity of the anchor location based on the one of numeric value and graphical representation to form a modified frame.

2. The method of claim 1 further comprising a step of:
    h) displaying the modified frame.

3. The method of claim 1 further comprising a step of:
    h) recording the modified frame.

4. The method of claim 1 further comprising a step of:
    h) storing a file including the modified frame.

5. The method of claim 1 wherein the step of locating the video of the sensor in the one of the frames to define an anchor location includes sub-steps of:
    i) checking the data corresponding to the array of pixels to determine whether a pixel within the array of pixels has data corresponding to an attribute of the sensor; and
    ii) determining the anchor location at a location of a pixel which has data corresponding to the attribute of the sensor.

6. The method of claim 5 wherein the attribute is a particular color.

7. The method of claim 1 wherein the step of locating the video of the sensor in one of the frames to define an anchor location includes sub-steps of:
    i) segmenting the frame into a plurality of sub-images;
    ii) within one of the sub-images, checking data corresponding to each pixel within the sub-image to determine whether a pixel within the sub-image has data corresponding to an attribute of the sensor;

iii) if the sub-image has a pixel having data corresponding to the attribute of the sensor, determining the anchor location at a location of the pixel which has data corresponding to the attribute of the sensor; and iv) if the sub-image does not have a pixel having data corresponding to the attribute of the sensor, continuing processing with a next one of the sub-images.

8. The method of claim 7 wherein the attribute is a particular color.

9. The method of claim 7 wherein, if it is known that the video of the sensor is more likely located within a particular sub-image than other sub-images, the particular sub-image is the one of the sub-images.

10. The method of claim 1 further comprising steps of:

selecting the graphical representation from a group of candidate graphical representations to define a selected graphical representation; and selecting parameters for the selected graphical representation, wherein, the step of converting the digitized sensor data to one of a numeric value and a graphical representation uses the selected graphical representation and the parameters.

11. The method of claim 1 wherein the graphical representation is one of a cloud, a halo, and an arrow.

12. The method of claim 1 wherein the sensor data includes data of a first type and data of a second type, and wherein the step of converting the digitized sensor data to one of a numeric value and a graphical representation includes sub-steps of:

varying a first attribute of the graphical representation based on the data of the first type; and varying a second attribute of the graphical representation based on the data of the second type.

13. The method of claim 12 wherein each of the first and second attributes of the graphical representation are selected from a group consisting of: size, length, diameter, inner diameter, outer diameter, color, brightness, sharpness and orientation.

14. A method for processing frames of video data, each frame including data corresponding to an array of pixels, including an image of a sensor, and data output by the sensor, the method comprising steps of:

a) locating the image of the sensor in one of the frames of video data to define an anchor location;

b) accepting the data output by the sensor;

c) converting the data output by the sensor to one of a numeric value and a graphical representation; and d) in the one of the frames, modifying pixels data in a vicinity of the anchor location based on the one of numeric value and graphical representation to form a modified frame.

15. The method of claim 14 further comprising a step of:

e) displaying the modified frame.

16. The method of claim 14 further comprising a step of:

e) recording the modified frame.

17. The method of claim 14 further comprising a step of:

e) storing a file including the modified frame.

18. The method of claim 14 wherein the step of locating the sensor in the one of the frames to define an anchor location includes sub-steps of:

i) checking the data corresponding to the array of pixels to determine whether a pixel within the array of pixels has an data corresponding to attribute of the sensor; and ii) determining the anchor location at a location of a pixel which has data corresponding to the attribute of the sensor.

19. The method of claim 18 wherein the attribute is a particular color.

20. The method of claim 14 wherein the step of locating the sensor in the one of the frames to define an anchor location includes sub-steps of:

i) segmenting the frame into a plurality of sub-images;

ii) within one of the sub-images, checking data corresponding to each pixel within the sub-image to determine whether a pixel within the sub-image has data corresponding to an attribute of the sensor;

iii) if the sub-image has a pixel having data corresponding to the attribute of the sensor, determining the anchor location at a location of the pixel which has data corresponding the attribute of the sensor; and iv) if the sub-image does not have a pixel having data corresponding to the attribute of the sensor, continuing processing with a next one of the sub-images.

21. The method of claim 20 wherein the attribute is a particular color.

22. The method of claim 20 wherein, if it is known that the video of the sensor is more likely located within a particular sub-image than other sub-images, the particular sub-image is the one of the sub-images.

23. The method of claim 14 further comprising steps of:

selecting the graphical representation from a group of candidate graphical representations to define a selected graphical representation; and selecting parameters for the selected graphical representation, wherein, the step of converting the digitized sensor data to one of a numeric value and a graphical representation uses the selected graphical representation and the parameters.

24. The method of claim 14 wherein the graphical representation is one of a cloud, a halo, and an arrow.

25. The method of claim 14 wherein the sensor data includes data of a first type and data of a second type, and wherein the step of converting the digitized sensor data to one of a numeric value and a graphical representation includes sub-steps of:

varying a first attribute of the graphical representation based on the data of the first type; and varying a second attribute of the graphical representation based on the data of the second type.

26. The method of claim 25 wherein each of the first and second attributes of the graphical representation are selected from a group consisting of: size, length, diameter, inner diameter, outer diameter, color, brightness, sharpness and orientation.

27. The method of claim 14, wherein the frames of video data include the field of view of an image capturing device, the method further comprising steps of:

e) fixing the field of view of the image capturing device;

f) moving the sensor with respect to the image capturing device;

g) converting the data output by the sensor to one of a numeric value and a graphical representation;

h) in at least one of the frames, modifying pixels in a vicinity of the anchor location based on the one of numeric value and graphical representation to form at least one modified frame;

i) sampling, in response to one of a user selection and a clock, the one of the numeric value and graphical representation replacing the pixels in the vicinity of the anchor location such that subsequent frames also include the one of the numeric value and graphical representation at and around the anchor location; and j) generating an inspection profile by repeating steps (f) through (i).

28. A device for inspecting an object, the device comprising:

a) a video generation device, having a field of view, for generating video frames of the object, each video frame including data corresponding to an array of pixels;

b) a sensor, located within the field of view of the video generation device, for detecting a physical phenomenon related to an attribute of the object;

c) a signal generation device, for generating a signal based on the physical phenomenon detected by the sensor;

d) a converter, receiving the signal from the signal generation device, for converting the signal to one of a numeric value and graphical representation;

e) an anchor generation device, receiving frames from the video generation device, for determining the location of an image of the sensor within a frame and generating an anchor at the location; and f) a video processing device, receiving the anchor from the anchor generation device, the frames from the video frame generation device, and the one of the numeric representation and graphical representation from the converter, for modifying pixels in a vicinity of the anchor in at least one of the frames, based on the one of the numeric value and graphical representation.

29. The device of claim 28 wherein the video generation device is a remote visual inspection device.

30. The device of claim 28 wherein the video generation device is one of (a) a video camera, (b) a borescope coupled with a video camera, (c) a fiberscope coupled with a video camera, and (d) a videoimagescope provided with a camera control unit.

31. The device of claim 30 wherein the sensor is provided through a working channel in the video generation device.

32. The device of claim 28 wherein the video generation device includes a 90 degree tip adapter and a fixed probe.

33. The device of claim 29 wherein the remote visual inspection device includes an insertion tube having a proximal end and a distal end, and including a working channel extending from the proximal end to the distal end of the insertion tube, and wherein the sensor passes through the working channel, the device further comprising a biasing system for biasing the sensor away from the distal end of the insertion tube.

34. The device of claim 28 wherein the sensor is one of an eddy current probe and an ultrasound probe.

35. The method of claim 1 wherein the data output by the sensor is non-video data.

36. The method of claim 1 wherein the image of the sensor included in the video data is within a field of view of an image capturing device.

37. The method of claim 14 wherein the data output by the sensor is non-video data.

38. The method of claim 14 wherein the image of the sensor included in the video data is within a field of view of an image capturing device.

* * * * *